(12) United States Patent
Badenes Corella et al.

(10) Patent No.: US 10,164,727 B1
(45) Date of Patent: Dec. 25, 2018

(54) SHARED SCHEDULE TIME SLOT ALLOCATION

(71) Applicant: Marvell International Ltd., Hamilton (BM)

(72) Inventors: Agustin Badenes Corella, Valencia (ES); Feliciano Gomez Martinez, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 179 days.

(21) Appl. No.: 15/041,187

(22) Filed: Feb. 11, 2016

Related U.S. Application Data

(60) Provisional application No. 62/114,799, filed on Feb. 11, 2015.

(51) Int. Cl.
| | | |
|---|---|---|
| *H04J 3/10* | (2006.01) | |
| *H04M 3/18* | (2006.01) | |
| *H04M 3/34* | (2006.01) | |
| *H04B 3/32* | (2006.01) | |
| *H04B 3/487* | (2015.01) | |
| *H04B 3/54* | (2006.01) | |

(52) U.S. Cl.
CPC .............. *H04J 3/10* (2013.01); *H04M 3/18* (2013.01); *H04M 3/34* (2013.01); *H04B 3/32* (2013.01); *H04B 3/487* (2015.01); *H04B 3/54* (2013.01)

(58) Field of Classification Search
CPC .. H04B 3/32; H04B 3/487; H04B 3/54; H04J 3/10; H04M 3/34; H04M 3/18
See application file for complete search history.

(56) References Cited

U.S. PATENT DOCUMENTS

| | | |
|---|---|---|
| 2011/0261674 A1 | 10/2011 | Maes et al. |
| 2012/0027060 A1 | 2/2012 | Singh et al. |
| 2013/0215951 A1* | 8/2013 | Nuzman .................. H04B 3/32 375/227 |
| 2014/0348139 A1 | 11/2014 | Martinez |

(Continued)

FOREIGN PATENT DOCUMENTS

WO    WO-2012/162576 A1    11/2012

OTHER PUBLICATIONS

U.S. Appl. No. 14/863,042, entitled "Transmission Power Level Configuration for Crosstalk Relationship," filed Sep. 23, 2015.

(Continued)

*Primary Examiner* — Marsha D Banks Harold
*Assistant Examiner* — Elton Williams

(57) ABSTRACT

A method for allocating time slots of a shared schedule for a plurality of communication lines having a crosstalk relationship is described. A first number of allocated time slots is allocated, according to respective priorities, corresponding to a first time interval for first data to be transmitted. The first data is transmitted. A second number of allocated time slots is allocated, corresponding to a second time interval for second data to be transmitted. The second number is larger than the first number if an allocation increase threshold has been met, based on utilization of a first time slot having a lowest priority of the first number of allocated time slots. The second number is smaller than the first number if an allocation decrease threshold has been met, based on utilization of a second time slot having a higher priority than the first time slot.

12 Claims, 20 Drawing Sheets

(56) References Cited

U.S. PATENT DOCUMENTS

| | | | |
|---|---|---|---|
| 2015/0124943 A1 | 5/2015 | Oksman et al. | |
| 2015/0280892 A1 | 10/2015 | Verbin et al. | |
| 2015/0304488 A1 | 10/2015 | Amde et al. | |
| 2016/0072613 A1* | 3/2016 | Esserman | H04L 5/0037 370/230 |
| 2016/0073448 A1 | 3/2016 | Strobel et al. | |

OTHER PUBLICATIONS

ITU-T Recommendation G.9960, "Unified high-speed wireline-based home networking transceivers—System architecture and physical layer specification," *Int'l Telecommunication Union*, pp. 1-160 (Dec. 2011).
ITU-T Recommendation G.9960, Erratum 1 to Recommendation ITU-T G.9960, *Int'l Telecommunication Union*, 1 page (Jul. 2012).
ITU-T Recommendation G.9960, Erratum 2 to Recommendation ITU-T G.9960, *Int'l Telecommunication Union*, 4 pages (Sep. 2012).
ITU-T Recommendation G.9961, "Unified high-speed wire-line based home networking transceivers—Data link layer specification," *Int'l Telecommunication Union*, pp. 1-220 (Jun. 2010).
ITU-T Recommendation G.9961, Corrigendum 1, "Unified high-speed wire-line based home networking transceivers—Data link layer specification," *Int'l Telecommunication Union*, pp. 1-158 (Dec. 2011).
ITU-T Recommendation G.9961, Amendment 1, "Unified high-speed wire-line based home networking transceivers—Data link layer specification," *Int'l Telecommunication Union*, pp. 1-80 (Sep. 2012).
ITU-T Recommendation G.9961, Corrigendum 2, "Unified high-speed wire-line based home networking transceivers—Data link layer specification," *Int'l Telecommunication Union*, pp. 1-122 (Jul. 2013).
ITU-T Recommendation G.9961, Amendment 2, "Unified high-speed wire-line based home networking transceivers—Data link layer specification," *Int'l Telecommunication Union*, pp. 1-44 (Apr. 2014).
ITU-T Recommendation G.9963, "Unified high-speed wireline-based home networking transceivers—Multiple input-multiple output specification" *Int'l Telecommunication Union*, pp. 1-90 (Dec. 2011).
Boyd et al., "Convex Optimization," *Cambridge University Press*, pp. 1-728 (2004).
Brown, "G.hn: Draft text for G.9960 (2010) corrigendum 1," *International Telecommunication Union*, pp. 1-184 (Feb. 2011).
Brown, "G.hn: Draft text for G.9961 (2010) corrigendum 1," *International Telecommunication Union*, pp. 1-282 (Feb. 2011).
Clausen, "Branch and Bound Algorithms—Principles and Examples," Department of Computer Science, University of Copenhagen, pp. 1-30 (Mar. 12, 1999).
Land et al., "An Automatic Method of Solving Discrete Programming Problems," *Econometrica*, vol. 28, No. 3, pp. 497-520 (Jul. 1960).
Lin et al., "Optimal and Near-Optimal Resource allocation Algorithms for OFDMA Networks," IEEE Transactions on Wireless Communications, vol. 8, No. 8, pp. 4066-4077 (Aug. 2009).

* cited by examiner $$\gamma_{ijk} = \frac{C_{ijk} \cdot p_{ijk} \cdot x_{ij}}{\eta_{kk} + \sum_{h \in \mathcal{I}_i} C_{ihk} \cdot p_{hjk} \cdot x_{hj}} \quad i \in \mathcal{N}, j \in \mathcal{M}, k \in \mathcal{K} \quad \leftarrow 302$$

$$v_{ij} = \Delta f \sum_{k \in \mathcal{K}} \log_2\left(1 + \frac{\gamma_{ijk}}{\beta}\right) \quad i \in \mathcal{N}, j \in \mathcal{M}. \quad \leftarrow 304$$

$$w_i = \frac{1}{T} \sum_{j \in \mathcal{M}} v_{ij} t_j \quad i \in \mathcal{N} \quad \leftarrow 306$$

$$\alpha = \max_{i \in \mathcal{N}} \{c_i - w_i\} \quad \leftarrow 308$$

$$\alpha(x, p) = \max_{i \in \mathcal{N}} \{c_i - w_i(x, p)\} \quad \leftarrow 310$$

$$\alpha_n(x) = \max_{i \in \mathcal{N}} \left\{\frac{c_i - w_i(x)}{c_i}\right\} \quad \leftarrow 312$$

*FIG. 3*

$$T^u = \sum_{j \in \mathcal{M}^u} t_j^u \qquad \leftarrow 402$$

$$T^d = \sum_{j \in \mathcal{M}^d} t_j^d \qquad \leftarrow 404$$

$$w_i^u = \frac{1}{T} \sum_{j \in \mathcal{M}^u} v_{ij} t_j^u \qquad \leftarrow 406$$

$$w_i^d = \frac{1}{T} \sum_{j \in \mathcal{M}^d} v_{ij} t_j^d \qquad \leftarrow 408$$

$$\alpha_n^u(x) = \max_{i \in \mathcal{N}} \left\{ \frac{e_i^u - w_i^u(x)}{e_i^u} \right\} \qquad \leftarrow 410$$

$$\alpha^d(x) = \max_{i \in \mathcal{N}} \left\{ \frac{e_i^d - w_i^d(x)}{e_i^d} \right\} \qquad \leftarrow 412$$

*FIG. 4*

$$x = \begin{bmatrix} 1 & 1 & 1 & 1 \\ 1 & 1 & 1 & 1 \\ 1 & 1 & 1 & 1 \\ 1 & 1 & 1 & 1 \\ 1 & 1 & 1 & 1 \\ 1 & 1 & 1 & 1 \end{bmatrix} \quad \leftarrow 502$$

$$x = \begin{bmatrix} 1 & 0 & 0 & 0 \\ 1 & 1 & 0 & 0 \\ 1 & 0 & 0 & 0 \\ 1 & 1 & 1 & 1 \\ 1 & 0 & 0 & 0 \\ 1 & 0 & 0 & 0 \end{bmatrix} \quad \leftarrow 504$$

$$w_i^{high} = w_i - v_{ih}\frac{\sigma_h^+}{T} \quad \leftarrow 506$$

$$w_i^{low} = w_i - v_{ih}\frac{t_h}{T} - v_{ig}\frac{\sigma_g^-}{T} \quad \leftarrow 508$$

FIG. 5

$$(P) \begin{cases} \text{minimize} & \alpha_n(x) = \max_{i \in \mathcal{N}} \left\{ \frac{c_i - w_i(x)}{c_i} \right\} \\ \text{over} & x \in \{0,1\}^{N \times M} \end{cases} \quad \leftarrow 902$$

$$w_i = \frac{1}{T} \sum_{j \in \mathcal{M}} w_{ij} t_j = \frac{1}{T} \sum_{j \in \mathcal{M}} t_j \Delta f \sum_{k \in \mathcal{K}} \log_2 \left(1 + \frac{\gamma_{ijk}}{\beta}\right) \quad \leftarrow 904$$

$$\gamma_{ijk} = \frac{C_{iik} \cdot \hat{p}_k \cdot x_{ij}}{\eta_{ik} + \sum_{h \in \mathcal{I}_i} C_{ihk} \cdot \hat{p}_k \cdot x_{hj}} \quad \leftarrow 906$$

$$x = \begin{bmatrix} 0 & 0 & 1 & 0 \\ 1 & 1 & 0 & 0 \\ 1 & 0 & 0 & 0 \\ 1 & 1 & 1 & 1 \\ 1 & 0 & 0 & 0 \\ 0 & 0 & 0 & 1 \end{bmatrix} \quad \leftarrow 908$$

*FIG. 9*

$$\alpha(x) \geq \tau', \forall x \in \mathcal{D}' \quad \longleftarrow 1002$$

$$\alpha(x) \geq \tau'', \forall x \in \mathcal{D}'' \quad \longleftarrow 1004$$

$$\mathcal{D}' \Leftrightarrow (\Delta, y) \quad \longleftarrow 1006$$

FIG. 10

| $\Delta$ | $y$ | Elements in subset $\mathcal{D}'$ defined by $(\Delta, y)$ |
|---|---|---|
| $\begin{bmatrix} 1 & 1 \\ 1 & 0 \end{bmatrix}$ | $\begin{bmatrix} 0 & 1 \\ 0 & 0 \end{bmatrix}$ | $\begin{bmatrix} 0 & 1 \\ 0 & 0 \end{bmatrix}, \begin{bmatrix} 0 & 1 \\ 0 & 1 \end{bmatrix}$ |
| $\begin{bmatrix} 1 & 1 \\ 0 & 0 \end{bmatrix}$ | $\begin{bmatrix} 0 & 1 \\ 0 & 0 \end{bmatrix}$ | $\begin{bmatrix} 0 & 1 \\ 0 & 0 \end{bmatrix}, \begin{bmatrix} 0 & 1 \\ 0 & 1 \end{bmatrix}, \begin{bmatrix} 0 & 1 \\ 1 & 0 \end{bmatrix}, \begin{bmatrix} 0 & 1 \\ 1 & 1 \end{bmatrix}$ |
| $\begin{bmatrix} 1 & 1 \\ 1 & 1 \end{bmatrix}$ | $\begin{bmatrix} 1 & 0 \\ 0 & 1 \end{bmatrix}$ | $\begin{bmatrix} 1 & 0 \\ 0 & 1 \end{bmatrix}$ |
| $\begin{bmatrix} 1 & 0 \\ 0 & 0 \end{bmatrix}$ | $\begin{bmatrix} 0 & 0 \\ 0 & 0 \end{bmatrix}$ | $\begin{bmatrix} 0 & 0 \\ 0 & 0 \end{bmatrix}, \begin{bmatrix} 0 & 1 \\ 0 & 0 \end{bmatrix}, \begin{bmatrix} 0 & 0 \\ 1 & 0 \end{bmatrix}, \begin{bmatrix} 0 & 1 \\ 1 & 0 \end{bmatrix},$ $\begin{bmatrix} 0 & 0 \\ 0 & 1 \end{bmatrix}, \begin{bmatrix} 0 & 1 \\ 0 & 1 \end{bmatrix}, \begin{bmatrix} 0 & 0 \\ 1 & 1 \end{bmatrix}, \begin{bmatrix} 0 & 1 \\ 1 & 1 \end{bmatrix}$ |

FIG. 11 1100

$$w_i(x) = \frac{1}{T}\sum_{j \in M} w_{ij} t_j = \frac{1}{T}\sum_{j \in M} t_j \Delta f \sum_{k \in \mathcal{K}} \log_2\left(1 + \frac{\gamma_{ijk}}{\beta}\right) \quad \longleftarrow 1202$$

$$\gamma_{ijk}(x) = \frac{C_{ijk} \cdot \hat{p}_k \cdot x_{ij}}{\eta_{jk} + \sum_{h \in \mathcal{I}_i} C_{ihk} \cdot \hat{p}_k \cdot x_{hj}} \quad \longleftarrow 1204$$

$$\hat{\gamma}_{ijk}(\mathcal{D}) = \frac{C_{ijk} \cdot \hat{p}_k \cdot \hat{x}_{ij}}{\eta_{jk} + \sum_{h \in \mathcal{I}_i} C_{ihk} \cdot \hat{p}_k \cdot \hat{x}_{hj}} \quad \longleftarrow 1206$$

$$\hat{w}_{ij}(\mathcal{D}') = \Delta f \sum_{k \in \mathcal{K}} \log_2\left(1 + \frac{\hat{\gamma}_{ijk}}{\beta}\right) \quad \longleftarrow 1208$$

$$\hat{w}_i(\mathcal{D}) = \frac{1}{T}\sum_{j \in M} \hat{w}_{ij}(\mathcal{D}) t_j = \frac{1}{T}\sum_{j \in M} t_j \Delta f \sum_{k \in \mathcal{K}} \log_2\left(1 + \frac{\hat{\gamma}_{ijk}(\mathcal{D})}{\beta}\right) \longleftarrow 1210$$

*FIG. 12*

$$w_i(x) \leq \hat{w}_i(\mathcal{D})$$
$$e_i - w_i(x) \geq e_i - \hat{w}_i(\mathcal{D})$$
$$\max_{i \in \mathcal{N}}\{e_i - w_i(x)\} \geq \max_{i \in \mathcal{N}}\{e_i - \hat{w}_i(\mathcal{D})\}$$
$$\min_{x \in \mathcal{D}}\left\{\max_{i \in \mathcal{N}}\{e_i - w_i(x)\}\right\} \geq \min_{x \in \mathcal{D}}\left\{\max_{i \in \mathcal{N}}\{e_i - \hat{w}_i(\mathcal{D})\}\right\}$$
$$\alpha(x^*) \geq \min_{x \in \mathcal{D}}\left\{\max_{i \in \mathcal{N}}\{e_i - \hat{w}_i(\mathcal{D})\}\right\}$$
$$\alpha(x^*) \geq \max_{i \in \mathcal{N}}\{e_i - \hat{w}_i(\mathcal{D})\}$$
$$\alpha(x^*) \geq \hat{\alpha}(\mathcal{D})$$

← 1302

$$\hat{\alpha}(\mathcal{D}) = \max_{i \in \mathcal{N}}\{e_i - \hat{w}_i(\mathcal{D})\}$$

$$\bar{p} = 1 \quad C = \begin{bmatrix} 1.00 & 0.01 & 0.01 \\ 0.01 & 1.00 & 0.01 \\ 0.01 & 0.01 & 1.00 \end{bmatrix} \quad \eta = \begin{bmatrix} 0.001 \\ 0.001 \\ 0.001 \end{bmatrix} \quad t = \begin{bmatrix} 1 & 2 & 4 & 8 \end{bmatrix} \quad \Delta_f = 1$$

← 1502

$$\epsilon = \begin{bmatrix} 9.96723 \\ 4.98361 \\ 0.12505 \end{bmatrix} \quad \longleftarrow 1504$$

$$x^* = \begin{bmatrix} 1 & 1 & 1 & 1 \\ 1 & 0 & 0 & 1 \\ 1 & 0 & 0 & 0 \end{bmatrix} \quad w(x^*) = \begin{bmatrix} 7.83893 \\ 3.85204 \\ 0.37356 \end{bmatrix} \quad \alpha(x^*) = 0.22706 \quad \longleftarrow 1506$$

FIG. 15

$$\alpha(x) = \max_{i \in \mathcal{N}} \{c_i - w_i(x)\} \quad \leftarrow 1702$$

$$\alpha_n(x) = \max_{i \in \mathcal{N}} \left\{ \frac{c_i - w_i(x)}{c_i} \right\} \quad \leftarrow 1704$$

$$\pi_0 = \frac{T_0^d}{T_0} = \frac{T_0^d}{T_0^d + T_0^u} \quad \leftarrow 1802$$

$$T_0^d = \pi_0 T_0 \quad \leftarrow 1804$$

$$T_0^u = (1 - \pi_0) T_0 \quad \leftarrow 1806$$

$$\pi = \frac{T^d}{T^d + T^u} = \frac{T^d}{T_0} \quad \leftarrow 1808$$

$$T^d = \pi T_0 = \pi \frac{T_0^d}{\pi_0} = \frac{\pi}{\pi_0} T_0^d \quad \leftarrow 1810$$

$$T^u = (1 - \pi) T_0 = (1 - \pi) \frac{T_0^u}{1 - \pi_0} = \frac{1 - \pi}{1 - \pi_0} T_0^u \quad \leftarrow 1812$$

$$t_j^d(\pi) = \frac{\pi}{\pi_0} \cdot t_j^d(\pi_0) \qquad t_j^u(\pi) = \frac{1 - \pi}{1 - \pi_0} \cdot t_j^u(\pi_0) \quad \leftarrow 1814$$

$$w_i^d(\pi) = \frac{1}{T} \sum_{j \in M} v_{ij}^d t_j^d(\pi) = \frac{1}{T} \sum_{j \in M} v_{ij}^d \frac{\pi}{\pi_0} t_j^d(\pi_0) = \frac{\pi}{\pi_0} \frac{1}{T} \sum_{j \in M} v_{ij}^d t_j^d(\pi_0) = \frac{\pi}{\pi_0} w_i^d(\pi_0)$$
$$\leftarrow 1816$$

$$w_i^u(\pi) = \frac{1}{T} \sum_{j \in M} v_{ij}^u t_j^u(\pi) = \frac{1}{T} \sum_{j \in M} v_{ij}^u \frac{1 - \pi}{1 - \pi_0} t_j^u(\pi_0) = \frac{1 - \pi}{1 - \pi_0} \frac{1}{T} \sum_{j \in M} v_{ij}^u t_j^u(\pi_0) = \frac{1 - \pi}{1 - \pi_0} w_i^u(\pi_0)$$
$$\leftarrow 1818$$

FIG. 18

$$\alpha_n^d(x,\pi) = \max_{i \in \mathcal{N}} \left\{ \frac{c_i^d - w_i^d(x,\pi)}{c_i^d} \right\}$$

$$= \max_{i \in \mathcal{N}} \left\{ 1 - \frac{w_i^d(x,\pi)}{c_i^d} \right\}$$

$$= 1 - \min_{i \in \mathcal{N}} \left\{ \frac{w_i^d(x,\pi)}{c_i^d} \right\} \quad \longleftarrow 1902$$

$$= 1 - \min_{i \in \mathcal{N}} \left\{ \frac{\pi}{\pi_0} \frac{w_i^d(x,\pi_0)}{c_i^d} \right\}$$

$$= 1 - \frac{\pi}{\pi_0} \min_{i \in \mathcal{N}} \left\{ \frac{w_i^d(x,\pi_0)}{c_i^d} \right\}$$

$$= 1 - \frac{\pi}{\pi_0} \left(1 - \alpha_n^d(x,\pi_0)\right)$$

$$\alpha_n^u(x,\pi) = 1 - \frac{1-\pi}{1-\pi_0} \min_{i \in \mathcal{N}} \left\{ \frac{w_i^u(x,\pi_0)}{c_i^d} \right\} \quad \longleftarrow 1904$$

$$= 1 - \frac{1-\pi}{1-\pi_0} \left(1 - \alpha_n^u(x,\pi_0)\right)$$

$$\alpha_n^t(\pi) = \max\{\alpha_n^d(\pi), \alpha_n^u(\pi)\} \quad \longleftarrow 1906$$

FIG. 19

$$\pi(1-\pi_0)(1-\alpha_n^d(\pi_0))-\pi(1-\alpha_n^d(\pi)) = \alpha_n^u(\pi)$$

$$= 1 - \frac{\pi}{\pi_0}(1-\alpha_n^d(\pi_0)) \cdot \frac{1-\pi}{1-\pi_0}(1-\alpha_n^u(\pi_0))$$

$$= \frac{\pi_0 - \pi(1-\alpha_n^d(\pi_0))(1-\pi)(1-\alpha_n^u(\pi_0))}{\pi_0}$$

$$= \pi_0(1-\pi_0) - \pi(1-\pi_0 - (1-\pi)(1-\alpha_n^u(\pi_0)))$$

$$= \pi_0(1-\pi_0 - \pi(1-\pi_0 - (1-\alpha_n^u(\pi_0)) - (1-\pi_0)\pi_0)$$

$$= \pi_0(1-\alpha_n^u(\pi_0))$$

$$\pi = \frac{\pi_0(1-\alpha_n^u(\pi_0))}{\pi_0(1-\alpha_n^u(\pi_0)) + (1-\pi_0)(1-\alpha_n^d(\pi_0))}$$

SHARED SCHEDULE TIME SLOT ALLOCATION

CROSS-REFERENCES TO RELATED APPLICATIONS

This application claims the benefit of U.S. Provisional Patent Application No. 62/114,799, entitled "TDMA-DSM: Time-Division Multiple-Access Dynamic Spectrum Management," filed on Feb. 11, 2015, the disclosure of which is incorporated herein by reference in its entirety.

FIELD OF THE DISCLOSURE

The present disclosure relates generally to communication networks and, more particularly, to configuration of transmission power spectral density (PSD) levels for communication lines with a crosstalk relationship.

BACKGROUND

Recently, a number of technologies have been introduced to provide high-speed transmission of multimedia data over existing communication lines, such as power wires, coaxial cables, and phone lines. One such technology is the "G.hn" standard developed by the Telecommunication Standardization Sector of the International Telecommunications Union (ITU-T). When multiple communication lines are near each other, for example, in a bundle of copper communication lines installed in a conduit, there is a potential for a crosstalk relationship between at least some of the communication lines. In some scenarios, crosstalk reduces a Signal to Noise Ratio (SNR) in affected communication lines and thereby reduces a maximum data rate which can be achieved in the affected communication lines. Existing solutions reduce the data rate in each line accordingly.

SUMMARY

In an embodiment, a method implemented in a first communication device for allocating time slots of a shared schedule for a plurality of communication lines having a crosstalk relationship includes allocating, by the first communication device, a first integer number of allocated time slots of the shared schedule corresponding to a first time interval for first data to be transmitted by the first communication device via one of the plurality of communication lines during the first integer number of allocated time slots. The first integer number of allocated time slots are allocated according to respective priorities of the time slots of the shared schedule in a decreasing order. The method includes transmitting, by the first communication device, the first data via the first integer number of allocated time slots. The method includes allocating, by the first communication device, a second integer number of allocated time slots of the shared schedule corresponding to a second time interval for second data to be transmitted by the first communication device via the one of the plurality of communication lines during the second integer number of time slots based on an allocation increase threshold and an allocation decrease threshold. The second integer number is larger than the first integer number if the allocation increase threshold has been met, wherein i) the allocation increase threshold is based on utilization by the first communication device of a first time slot of the first integer number of allocated time slots, and ii) the first time slot has a lowest priority of the first integer number of allocated time slots. The second integer number is smaller than the first integer number if the allocation decrease threshold has been met, wherein i) the allocation decrease threshold is based on utilization by the first communication device of a second time slot of the first integer number of allocated time slots, and ii) the second time slot has a higher priority than the first time slot.

In another embodiment, a first communication device that allocates time slots of a shared schedule for a plurality of communication lines having a crosstalk relationship includes a network interface device having one or more integrated circuits. The one or more integrated circuits are configured to allocate a first integer number of allocated time slots of the shared schedule corresponding to a first time interval for first data to be transmitted by the first communication device via one of the plurality of communication lines during the first integer number of allocated time slots. The first integer number of allocated time slots are allocated according to respective priorities of the time slots of the shared schedule in a decreasing order. The one or more integrated circuits are configured to transmit the first data via the first integer number of allocated time slots. The one or more integrated circuits are configured to allocate a second integer number of allocated time slots of the shared schedule corresponding to a second time interval for second data to be transmitted by the first communication device via the one of the plurality of communication lines during the second integer number of time slots based on an allocation increase threshold and an allocation decrease threshold. The second integer number is larger than the first integer number if the allocation increase threshold has been met, wherein i) the allocation increase threshold is based on utilization by the first communication device of a first time slot of the first integer number of allocated time slots, and ii) the first time slot has a lowest priority of the first integer number of allocated time slots. The second integer number is smaller than the first integer number if the allocation decrease threshold has been met, wherein i) the allocation decrease threshold is based on utilization by the first communication device of a second time slot of the first integer number of allocated time slots, and ii) the second time slot has a higher priority than the first time slot.

In an embodiment, a method implemented in a first device of a plurality of devices for allocating time slots of a shared schedule for a plurality of communication lines having a crosstalk relationship includes receiving, at the first device and from other devices of the plurality of devices, a plurality of resource requests. Each of the plurality of resource requests is indicative of a requested data rate for a different one of the plurality of communication lines. Each of the plurality of communication lines is associated with a respective pair of devices within the plurality of devices. The method includes determining, by the first device, a set of channel coefficients that indicates the crosstalk relationship and a set of noise coefficients that indicates a background noise for receivers associated with the plurality of communication lines. The method also includes determining, by the first device, an allocation of time slots of the shared schedule within a first time interval for the plurality of communication lines based on the plurality of resource requests and the set of channel coefficients according to a branch and bound algorithm. The allocation of time slots indicates whether transmitters associated with the plurality of communication lines are allowed to transmit during the time slots of the shared schedule within the first time interval. The method includes causing, by the first device, the transmitters associated with the plurality of communication lines to operate using the determined allocation of time slots.

In another embodiment, a first communication device that allocates time slots of a shared schedule for a plurality of communication lines having a crosstalk relationship includes a network interface device having one or more integrated circuits. The one or more integrated circuits are configured to receive, from other devices of the plurality of devices, a plurality of resource requests. Each of the plurality of resource requests is indicative of a requested data rate for a different one of the plurality of communication lines. Each of the plurality of communication lines is associated with a respective pair of devices within the plurality of devices. The one or more integrated circuits are configured to determine a set of channel coefficients that indicates the crosstalk relationship and a set of noise coefficients that indicates a background noise for receivers associated with the plurality of communication lines. The one or more integrated circuits are configured to determine an allocation of time slots of the shared schedule within a first time interval for the plurality of communication lines based on the plurality of resource requests and the set of channel coefficients according to a branch and bound algorithm. The allocation of time slots indicates whether transmitters associated with the plurality of communication lines are allowed to transmit during the time slots of the shared schedule within the first time interval. The one or more integrated circuits are configured to cause the transmitters associated with the plurality of communication lines to operate using the determined allocation of time slots.

BRIEF DESCRIPTION OF THE DRAWINGS

FIG. 3, FIG. 4, and FIG. 5 are diagrams of example equations, according to various embodiments.

FIG. 9 and FIG. 10 are diagrams of example equations, according to various embodiments.

FIG. 11 is a diagram of an example table illustrating constraint matrices, value matrices, and corresponding subset, according to an embodiment.

FIG. 12 and FIG. 13 are diagrams of example equations, according to various embodiments.

FIG. 15 is a diagram of example equations, according to an embodiment.

FIG. 16 is a diagram of an example graph that illustrates a number of iterations used to determine an optimal solution to the branch and bound algorithm, according to an embodiment.

FIG. 17, FIG. 18, FIG. 19, and FIG. 20 are diagrams of example equations, according to various embodiments.

DETAILED DESCRIPTION

When multiple communication lines are near each other (for example, copper communication lines in a bundle installed in a common conduit), there is potential for crosstalk between them. This crosstalk reduces the Signal to Noise Ratio (SNR) in each communication line, and thus a transmission capacity or data rate achievable over each communication line is also reduced. As one example, in a G.hn communication system where only one communication line is currently active (i.e., transmitting data), that communication line achieves a data rate of 700 megabits per second (Mbps). However, when multiple communication lines in the same bundle are active in this example, the crosstalk between communication lines reduces the SNR and thus limits the data rate of each communication line to 400 Mbps. As a further example, a communication system having four communication lines might achieve 700 Mbps when only one communication line is active, 500 Mbps when two communication lines are active, 440 Mbps when three communication lines are active, and 400 Mbps when all four communication lines are active. This reduction in per-line performance is acceptable for as long as all lines use the achieved data rate. However, this results in inefficient use of resources if some or all of the lines do not have enough traffic.

In some embodiments and/or scenarios, a more efficient configuration of the communication lines is achieved by utilizing a shared schedule of time slots for the communication lines and allocating time slots for accessing the communication lines. In some embodiments, a number of allocated time slots is adjusted based on the utilization of currently allocated time slots. In an embodiment, for example, a communication device does not utilize time slots of the shared schedule unless needed, which increases the signal-to-noise ratio (SNR) of the other communication devices thus increasing an average data rate for the other communication devices.

In some embodiments, a "branch and bound" algorithm is used to find, for a given set of problem inputs (e.g., resource requests, channel coefficients that indicate crosstalk, etc.), a mathematically optimal solution. In an embodiment, performance metrics are computed for at least some allocations to indicate how "bad" a possible allocation is when trying to meet the requirements of requested data rates and then an allocation is chosen that minimizes the performance metric (e.g., a "least bad" allocation is selected). The allocation of time slots indicates whether transmitters associated with a plurality of communication lines are allowed to transmit during the time slots of the shared schedule. In an embodiment, a lower bound for a plurality of possible allocations is determined and the plurality of possible allocations is discarded if the lower bound is greater than an upper bound for the branch and bound algorithm.

Figure 1:
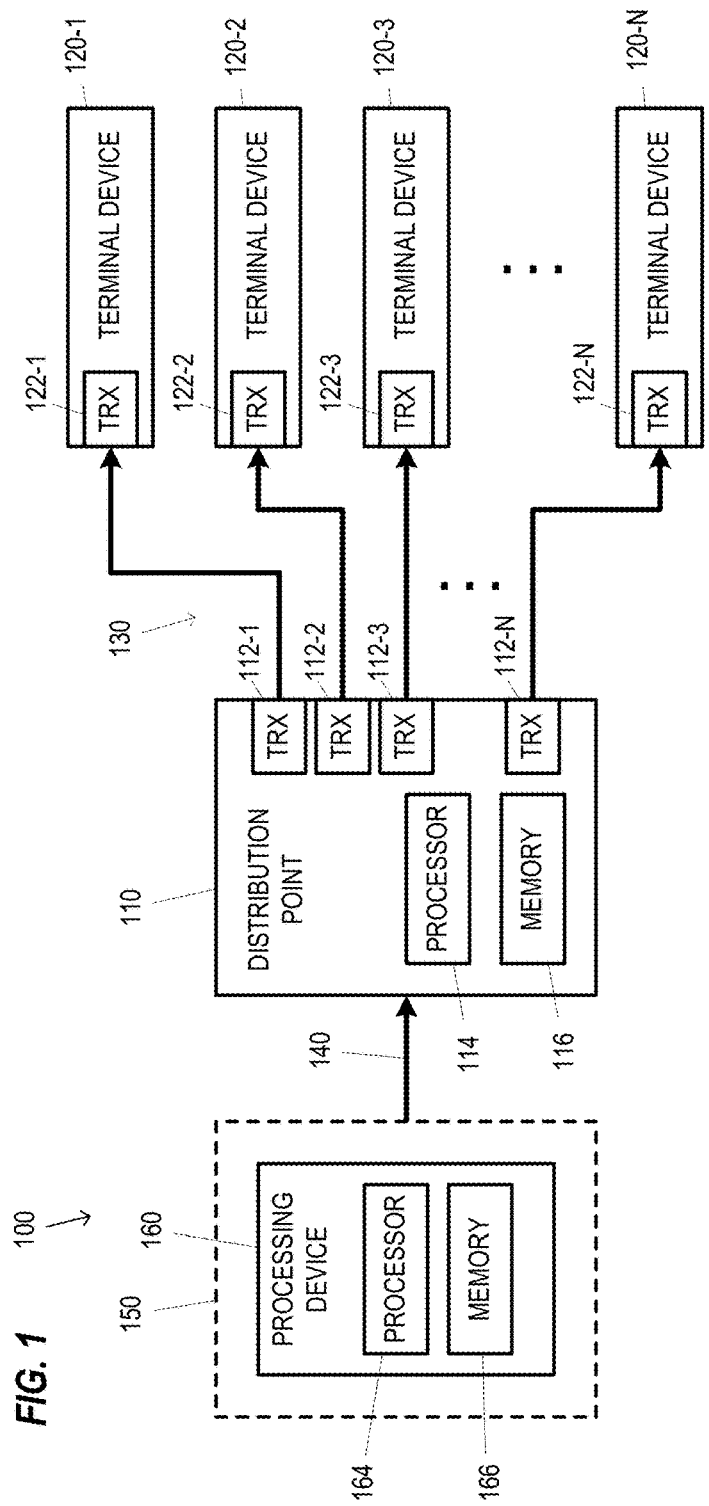
FIG. 1 is a block diagram of an example communication system, according to an embodiment.

FIG. 1 is a block diagram of an example communication system 100, according to an embodiment. A first communication device 110 includes one or more processors 114 and a memory 116 and is communicatively coupled with a plurality of second terminal devices 120 by a corresponding plurality of communication lines 130. In various embodiments, the communication device 110 is a network distribution point, optical network terminal, broadband access distribution point, or other suitable distribution device for a communication line 140. In various embodiments, each communication device 120 is a terminal device, modem, network device, subscriber device, customer premise equipment, or other suitable device. Each communication device 120 includes a transceiver 122 that is coupled with a corresponding transceiver 112 of the communication device 110 via a communication line 130. In some embodiments, one or more of the transceivers 112 or transceivers 122 is implemented as separate pairs of transmitters and receivers (e.g., an upstream pair and a downstream pair). In various embodiments, the communication lines 130 are power lines, telephone lines, twisted pair lines, or coaxial lines. Each transmitter (or transmitter portion of the transceiver) utilizes a transmission power spectral density (PSD) level. The transmission PSD level is held generally constant, for example, at a maximum power level, at a preselected power level (e.g., according to a regulatory mask), or other suitable level, in various embodiments. In other embodiments, the transmission PSD levels are dynamically determined. In an embodiment, the transceivers 112 and 122 are configured to use one or more signal to noise ratio (SNR)-bitloading tables or bit allocation tables (BATs) to identify a number of bits per tone for mapping bits onto orthogonal frequency division multiplex (OFDM) symbols. In some embodiments, the terminal devices 120 include respective processors (not shown) and memory (not shown), similar to the processor 114 and memory 116.

For simplicity of explanation, the embodiments described herein refer to the communication device 110 as the distribution point 110 and the communication device 120 as the terminal device 120. In some embodiments, the distribution point 110 and terminal devices 120 communicate according to G.hn standards and protocols, as described in International Telecommunication Union Telecommunication ("ITU-T") Recommendation G.9960 and G.9961. In other embodiments, the distribution point 110 and terminal devices 120 communicate according to another suitable communication protocol. The distribution point 110 provides a gateway or interface to another communication network 150, such as to a local area network, Wi-Fi network, WiMAX network, wide area network, the Internet, or other wired or wireless networks. The distribution point 110 may provide access to a fiber channel network, cable Internet network, or other high speed network. In some embodiments, the communication network 150 is a service provider network, wide area network (WAN), passive optical network (PON), gigabit Ethernet network, or other suitable network and the communication line 140 is an optical line, twisted pair line, coaxial line, or other communication line suitable for the communication network 150.

In an embodiment, the communication network 150 includes a processing device 160, for example, a communication device, a network server, distributed processing platform, cloud service, or other suitable computing platform. The processing device 160 includes one or more processors 164 and a memory 166 and is communicatively coupled with the distribution point 110. In some embodiments, the processing device 160 has a larger amount of memory and/or processing resources available than the distribution point 110, allowing the distribution point 110 to offload resource intensive tasks, for example, calculation of a performance metric and/or selection of an allocation, as described herein.

In various embodiments and/or scenarios, the distribution point 110 and terminal devices 120 are configured to operate using a shared schedule of time slots. In various embodiments, the shared schedule includes an integer number M time slots that are repeated over a plurality of time intervals (i.e., M time slots per time interval). The distribution point 110, the terminal devices 120, and/or the processing device 160 determine an allocation of time slots of the shared schedule. In some embodiments and/or scenarios, the allocation of time slots indicates whether the transceivers 112 or other transmitters associated with the plurality of communication lines are allowed to transmit during the time slots of the shared schedule for downlink communications. In other embodiments and/or scenarios, the allocation of time slots indicates whether the transceivers 122 or other transmitters associated with the plurality of communication lines are allowed to transmit during the time slots of the shared schedule for uplink communications. In still other embodiments, the allocation of time slots corresponds to both the transceivers 112 (for downstream communications) and the transceivers 122 (for upstream communications) between the distribution point 110 and the terminal devices 120. For clarity of explanation, portions of the present discussion generally refer to downstream communication between the transceivers 112 and transceivers 122.

In some embodiments and examples described herein, the plurality of second terminal devices 120 includes N terminal devices 120 and N communication lines 130, where N is an integer. Although four transceivers 112, four communication lines 130, and four terminal devices 120 are illustrated in FIG. 1, the communication system 100 includes other suitable numbers (e.g., 2, 3, 8, 24, 256, etc.) of transceivers 112, communication lines 130, and terminal devices 120 in other embodiments. In some embodiments, some of the transmitters are physically distributed across multiple communication devices 110 (for example, one communication device with 24 lines and another communication device with 24 lines, for a total of 48 lines), but the system is managed as if it were a single communication device from a logical point of view.

In various embodiments and/or scenarios, the distribution point 110 is configured to estimate the channel frequency response (CFR) between a transceiver 112 and corresponding transceiver 122. For example, in an embodiment, the distribution point 110 is configured according to the International Telecommunication Union Telecommunication Standardization Sector (ITU-T) G.9960 Recommendation (also known as the G.hn specification), the G.9700 Recommendation (also known as the G.fast specification) or other suitable network standards. In this embodiment, the distribution point 110 manages the exchange of communication line probes, such as G.hn probes, between the transmitters 112 and receivers 122. For example, in an embodiment, the distribution point 110 broadcasts a probe schedule to each transmitter and receiver pair for the communication lines 130. The probe schedule indicates transmission times or other suitable information for scheduling the G.hn probes. The distribution point 110 sets the probe schedule such that the G.hn probes are periodically transmitted over each communication line 130 and that when each G.hn probe is transmitted, no other transceiver 112 is transmitting over the plurality of communication lines 130. In some embodiments, the probe schedule also indicates an orthogonal preamble to be used for the corresponding G.hn probe. In various embodiments, the distribution point 110 determines the CFR for each of the plurality of communication lines 130 during a channel estimation period or a system maintenance period. In an embodiment, for example, the distribution point 110 estimates the CFR of the channel from the transceiver 122 to the transceiver 112 and receives an estimate of the CFR of the channel from the transceiver 112 to the transceiver 122 from the terminal devices 120. In other words, the distribution point 110 estimates uplink CFRs and receives downlink CFRs that have been estimated by the terminal devices 120. In an embodiment, the distribution point 110 estimates or determines the CFR for at least some of the plurality of communication lines 130 at different times and periodically updates the channel coefficients $C_{ijk}$ as updated CFR values are estimated.

Figure 2:
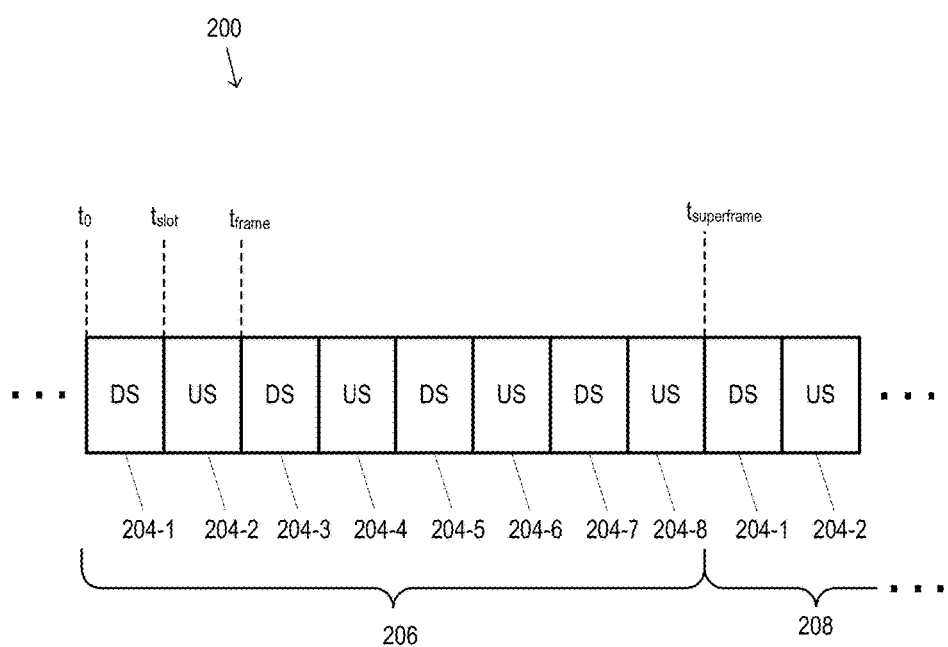
FIG. 2 is a diagram of an example shared schedule of time slots, according to an embodiment.

FIG. 2 is a diagram of an example shared schedule 200 of time slots 204, according to an embodiment. In various embodiments, the distribution point 110 controls the plurality of communication lines 130, including whether transmitters (e.g., transceivers 112 and transceivers 122) associated with the plurality of communication lines 130 are allowed to transmit during the time slots 204. For example, the plurality of communication lines 130 are synchronized with respect to the time slots 204 to reduce effects of near end crosstalk. In some embodiments, the shared schedule 200 repeats over multiple time intervals, for example, superframes 206 and 208 having duration $t_{superframe}$. In the embodiment shown in FIG. 2, only two superframes 206 and 208 are shown, but the shared schedule 200 repeats over a plurality of superframes, in various embodiments. In an embodiment, the superframe 206 corresponds to a medium access control (MAC) cycle of 10 milliseconds, 20 milliseconds, or other suitable duration. Each superframe 206 and 208 includes a set of an integer number F of time slots 204 and thus $t_{superframe}=F*t_{frame}$. Although eight time slots arranged in frames of two time slots each are illustrated in FIG. 2, the shared schedule 200 can include different numbers (e.g., 2, 3, 4, 10, etc.) of time slots 204 and/or frames, in various scenarios and embodiments. In some embodiments, the time slots 204 are divided into upstream (US) time slots for transmissions from transceiver 122 to transceiver 112 and downstream (DS) time slots for transmissions from transceiver 112 to transceiver 122. In other embodiments, each superframe 206 includes only DS time slots or US time slots. In the embodiment illustrated in FIG. 2, an equal number (four) of the DS time slots and US time slots are arranged in the shared schedule 200 in an alternating manner. In other embodiments, the shared schedule 200 includes more DS time slots than US time slots, for example, six DS time slots and two US time slots, five DS time slots and 3 US time slots, or another suitable arrangement.

In various embodiments and/or scenarios, the shared schedule 200 is divided into bit allocation table (BAT) regions or segments. In an embodiment, the number of bits that can be suitably mapped to a tone for an OFDM symbol is variable based on the signal to noise ratio. In some scenarios, the signal to noise ratio changes during the shared schedule 200 and the number of bits mapped per tone is changed according to the signal to noise ratio. In various embodiments, the shared schedule 200 is divided into segments based on the changes in the number of bits mapped per tone. In an embodiment, the distribution point 110 selects the segments (e.g., start and stop times for the segments) to be substantially aligned with boundaries of the time slots 204. In other embodiments, the segments overlap one or more boundaries of the time slots 204. While the embodiments described herein generally refer to the allocation of the time slots 204, it will be understood that the time slots can be BAT segments, in other suitable embodiments.

Each time slot 204 of the shared schedule 200 has a duration $t_{slot}$. In an embodiment, each time slot 204 has a same duration. In another embodiment, DS time slots have a first duration while US time slots have a second duration that is shorter than the first duration. In yet another embodiment, the distribution point 110 dynamically determines the duration of one or more time slots 204, for example, based on requested data rates, squared channel frequency response coefficients, bit allocation table values, or other suitable factors. In some embodiments and/or scenarios, the distribution point 110 or processing device 160 determines the first duration and the second duration, for example, based on requested data rates for the plurality of communication lines 130. In some embodiments, a DS time slot and a US time slot form a frame having duration $t_{frame}$. In one such embodiment, each time slot 204 has a duration $t_{slot}$ of 5 milliseconds, each frame (e.g., a frame that includes time slot 204-1 and time slot 204-2) has a duration $t_{frame}$ of 10 milliseconds, and each superframe 206 has a duration $t_{superframe}$ of 40 milliseconds. In another embodiment, each frame has a duration $t_{frame}$, but the distribution point 110 or processing device 160 selects a ratio between the first duration for the DS time slot and the second duration for the US time slot within the frame.

In some embodiments, each time slot 204 of the shared schedule 200 has a priority and an allocation includes time slots allocated according to the respective priorities in a decreasing order, in various embodiments. In an embodiment, the time slots 204 are arranged in time sequentially by priority in decreasing order. For example, time slot 204-1 has a highest priority while time slot 204-8 has a lowest priority. In another embodiment, each time slot 204 of the shared schedule 200 has a priority that corresponds to a time slot data rate (i.e., a data rate achievable during the time slot) with higher data rates corresponding to a higher priority. In still other embodiments, each time slot 204 of the shared schedule 200 has a same priority.

In an embodiment, the distribution point 110 is configured to obtain a squared channel frequency response coefficient (or other suitable frequency response metric) between each transceiver 112 and each transceiver 122 and an estimate of noise power (e.g., background noise) in each of the plurality of communication lines 130. In some embodiments, the distribution point 110 obtains the squared channel frequency response coefficient and the noise power during a training period at a start of operation of the communication system 100. In an embodiment, the distribution point 110 refreshes the squared channel frequency response coefficient and the noise power measurements (e.g., periodically at a predetermined time interval, upon the occurrence of an event, or other suitable trigger). In an embodiment, the distribution point 110 is configured to measure data traffic sent through each of the plurality of communication lines 130 during a traffic measurement interval.

Various equations are described herein and illustrated in FIG. 3, FIG. 4, FIG. 5, FIG. 9, FIG. 10, FIG. 12, FIG. 13, FIG. 15, FIG. 17, FIG. 18, FIG. 19, and FIG. 20. In the description below, the following variables are used:

N: A number of active lines in the system 100.

M: A number of BAT regions or time slots 204 in the system 100.

K: A number of OFDM tones in the system 100.

$\mathcal{N}$: Set of active lines in the system 100, with $\mathcal{N} = \{1, 2, \ldots, N\}$.

$\mathcal{M}$: A set time slots 204, with $\mathcal{M} = \{1, 2, \ldots, M\}$.

$\mathcal{K}$: A set of OFDM tones used in each line, with $\mathcal{K} = \{1, 2, \ldots, K\}$ $t_j$: A duration (in seconds) of the j-th time slot, with $j \in \mathcal{M}$.

T: A combined duration of all time slots, where $T = \sum_{j \in \mathcal{M}} t_j$.

$x_{ij}$: An allocation with possible values $\{0, 1\}$ that specifies whether the i-th communication line 130 is allowed to transmit during the j-th time slot, with i $\in \mathcal{N}$ and j$\in \mathcal{M}$. In some embodiments, it is assumed that if $x_{ij}=1$, then the transmitter for line i will transmit for the whole duration of the j-th time slot, using dummy probes as needed.

$p_{ijk}$: A PSD level used by the transmitter of the i-th communication line, during the j-th time slot, at the k-th tone, with i $\in \mathcal{N}$, j$\in \mathcal{M}$, and k$\in \mathcal{K}$.

$C_{ijk}$: A squared channel response coefficient from the j-th transmitter to the i-th receiver at the k-th tone, with i, j$\in \mathcal{N}$, and k$\in \mathcal{K}$.

$\eta_{ik}$: Thermal noise power at the i-th receiver, at the k-th tone, with i$\in \mathcal{N}$, k$\in \mathcal{K}$.

$\mathcal{J}_i$: A set of interferers to communication line i, i.e., all lines of the plurality of communication lines 130 except for communication line i, $\mathcal{J}_i = \mathcal{N} - \{i\}$, with i$\in \mathcal{N}$.

$\gamma_{ijk}$: Signal to noise ratio at the i-th receiver, in the j-th time slot, at the k-th tone, i$\in \mathcal{N}$, j$\in \mathcal{M}$, k$\in \mathcal{K}$, computed as shown in equation 302 (FIG. 3).

$v_{ij}$: time slot data rate (e.g., instantaneous channel capacity in bits per seconds) for the i-th communication line during the j-th time slot, computed as shown in equation 304 (FIG. 3), where $\beta$ is a system SNR gap that is greater than 1 and $\Delta f$ is a tone width.

$w_i$: allocated average data rate (e.g., average channel capacity in bits per seconds) for the i-th communication line across all time slots of the shared schedule, computed as shown in equation 306 (FIG. 3).

$e_i$: requested data rate (e.g., an estimated desired data rate in bits per second) for the i-th communication line, with i$\in \mathcal{N}$. In various embodiments, $e_i$ is estimated based on observed traffic or configured by a service provider of the communication system 100.

$\alpha$: performance metric that corresponds to an overall performance of the communication system 100 at meeting the requested data rates $e_i$. In an embodiment, a is computed as shown in equation 308 (FIG. 3). In another embodiment, $\alpha$ is computed as a function of the power configuration p and the allocation of time slots, as shown in equation 310 (FIG. 3), where $x \in \{0, 1\}^{N \times M}$ is the matrix with elements $\{x_{ij}\}$, and $p \in \mathbb{R}_+^{N \times M \times K}$ is the array with elements $\{p_{ijk}\}$.

$\alpha_n$: a normalized version of the performance metric $\alpha$, computed as shown in equation 312 (FIG. 3).

The performance metric $\alpha$ is used to compare different allocations of time slots and determine how well each allocation meets the requested data rate e, in various embodiments. In an embodiment, the performance metric $\alpha$ is selected to be used in comparisons even in cases where some values of w(x, p) are greater than or equal to e while other values of w(x, p) are not greater than or equal to e. In an embodiment, the performance metric is a function $\alpha(x, p)$. The function $\alpha(x, p)$ provides a performance metric for comparison of various allocations, for example, how "bad" a possible allocation x is when trying to meet the requirements of the requested data rates e (i.e., lower values of the performance metric indicate a more desirable allocation).

In various embodiments, the communication system 100 is configured for both upstream and downstream data transmissions. Where applicable, instances of the variables described above are indicated as corresponding to upstream communications by adding u as a superscript, while those corresponding to downstream communications have a d as a superscript. For example, $C_{ijk}^d$ is the squared channel response from the j-th transmitter to the i-th receiver, at the k-th tone, in the downstream direction, while $C_{ijk}^u$ is the corresponding variable for the upstream direction. In some embodiments, the number of time slots or BAT regions in the upstream direction $M^u$ is different from the number of time slots in the downstream direction $M^d$. In some embodiments, the duration of a time slot $t_j^u$ in the upstream direction need not be equal to the corresponding duration of a time slot $t_j^d$ in the downstream direction.

In some embodiments, the combined duration T is based on some time slots $T^u$ being used for upstream communications as shown in equation 402, while other time slots $T^d$ are used for downstream communications as shown in equation 404, where $T=T^u+T^d$. The allocated average data rate in the upstream direction $w_i^u$ is shown in equation 406, while the allocated average data rate in the downstream direction $w_i^d$ is shown in equation 408, in an embodiment. In this embodiment, the normalized performance metric $\alpha_n^u$ is shown in equation 410 and the normalized performance metric $\alpha_n^d$ is shown in equation 412. For simplicity of explanation, the superscript d or u is omitted. In some embodiments, the upstream and downstream variables are computed to be equal to each other. In other embodiments, for a given allocation of upstream and downstream time slots $t_j^u$ and $t_j^d$, the allocation is determined independently for each direction.

In current G.hn standard systems, a "flat PSD" is used, so that $p_{ijk}=\hat{p}_k$ where $\hat{p}_k$ is defined by a regulatory PSD mask, and $x_{ij}=1$, $\forall i \in \mathcal{N}$, $\forall j \in \mathcal{M}$, as shown by matrix 502. In some embodiments, an allocation of time slots is selected for a time interval based on utilization of allocated time slots for a prior time interval. In an embodiment, the distribution point 110 performs a "left-to-right" allocation process to allocate time slots to the transceivers 112 and/or 122. In another embodiment, the terminal devices 120 perform the left-to-right allocation process independently for the corresponding communication line 130, for example, without using a centralized entity such as the distribution point 110.

The left-to-right allocation process utilizes a flat PSD for the transceivers 112 and 122 and, for each communication line 130, time slots having a lower index j are allocated before time slots with a higher index j, in an embodiment. For example, the time slots are selected as needed based on priority, where the time slots of the shared schedule 200 are arranged in time sequentially by priority in a decreasing order. The left-to-right allocation process iteratively adapts to changes in the requested data rate $e_i$, so that if $e_i$ increases, then the number of allocated slots is increased for a subsequent time interval is increased, while if $e_i$ decreases, then the number of allocated slots is reduced for the subsequent time interval. Accordingly, the left-to-right allocation process will tend to result in an allocation in which most lines have $x_{ij}=1$ for low values of j, while most lines will have $x_{ij}=0$ for high values of j. As an example, matrix 504 shows a scenario where communication lines 1, 3, 5, and 6 (i.e., rows 1, 3, 5, and 6) have little traffic, while communication line 2 has moderate traffic, and line 4 has heavy traffic. For the example shown in matrix 504, communication line 4 would likely have a relatively low time slot data rate $v_{ij}$ where j=1 due to the strong far end cross talk from its neighbor communication lines (i.e., the first column of matrix 504), while having a relatively high time slot data rate $v_{ij}$ where j=3 or 4.

Mathematical computations for performing the left-to-right allocation process can be performed iteratively to determine $x_{ij}$. In various embodiments, a set of parameters $\sigma_j^+$ and $\sigma_j^-$ are selected with j$\in \mathcal{M}$ such that $\sigma_j^+ < t_j$ and $\sigma_j^- < t_j$. The parameters $\sigma_j^+$ and $\sigma_j^-$ are utilized to control a sensitivity to saturation conditions (e.g., utilization of allocated time slots) and how quickly the allocation process will increase or reduce the number of slots allocated to a communication line 130. In an embodiment, $\sigma_j^+$ and $\sigma_j^-$ are equal to each other. In other embodiments, different values for $\sigma_j^+$ and $\sigma_j^-$ are utilized, for example, such that $\sigma_j^+<\sigma_j^-$. In an embodiment, $\sigma_j^+$ and $\sigma_j^-$ are both equal to $0.25*t_j$. In this embodiment, if the last quarter portion of the last allocated time slot is used (i.e., the lowest priority time slot of the allocated time slots for the communication line 130), an additional time slot is allocated for the next time interval in the shared schedule 200.

In some embodiments, an allocation increase threshold $w_i^{high}$ and an allocation decrease threshold $w_i^{low}$ are used to determine the allocation. In an embodiment, after a suitable number of consecutive occurrences of the corresponding threshold being met (e.g., one, two three, or more occurrences), the distribution point 110 updates the allocation. As an example with the allocation shown in the matrix 504, an integer number $q_i$ is the number of non-zero elements in the i-th row of the matrix x, for example, a number of allocated time slots for the communication line i. For simplicity in notation, a variable $h=q_i$ and a variable $g=q_i-1$. In this embodiment, the allocation increase threshold is shown in equation 506 and the allocation decrease threshold is shown in equation 508. In an embodiment, the distribution point 110 increments an increase counter $l_i^{inc}$ each time the allocation increase threshold $w_i^{high}$ is met and when the increase counter reaches an integer increase threshold $L_i^{inc}$, the additional time slot is allocated for the next time interval. In an embodiment, the distribution point 110 increments a decrease counter $l_i^{dec}$ each time the allocation decrease threshold $w_i^{low}$ is met and when the decrease counter reaches an integer decrease threshold $L_i^{dec}$, a lower number of time slots are allocated for the next time interval.

Figure 6:
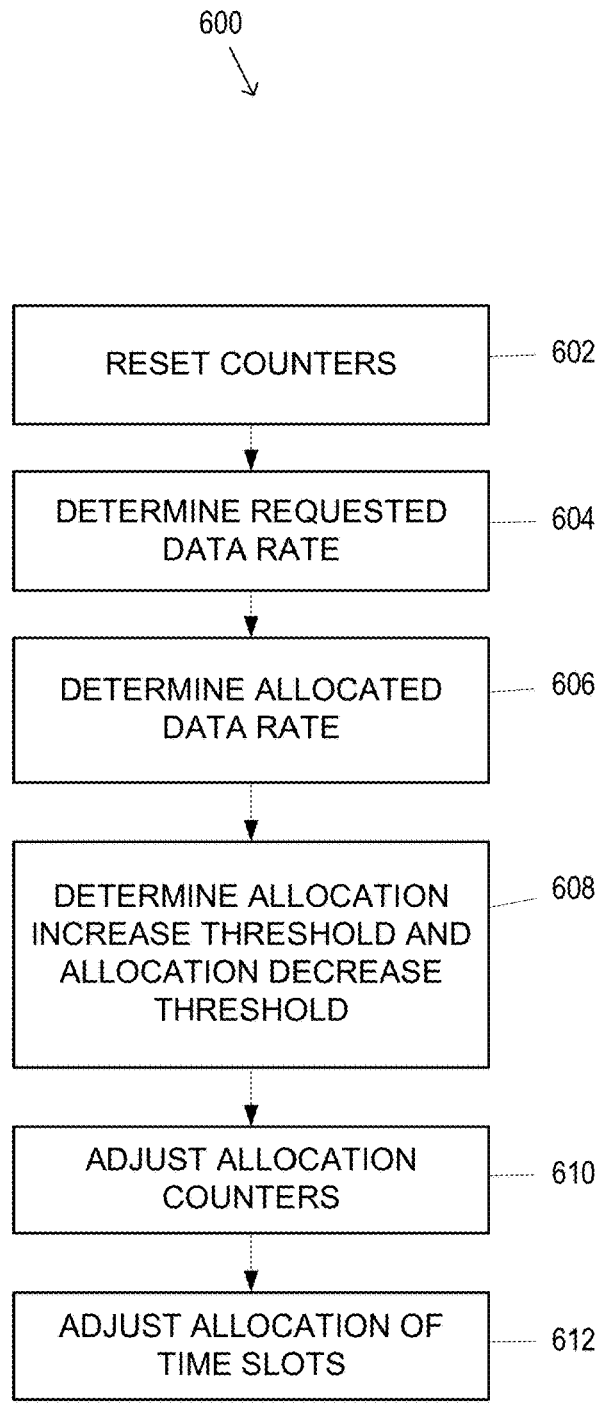
FIG. 6 is a flow diagram of an example method for allocating time slots using a left-to-right allocation process, according to an embodiment.

FIG. 6 is a flow diagram of an example method 600 for allocating time slots using the left-to-right allocation process, according to an embodiment. With reference to FIG. 1, the method 600 is implemented by the distribution point 110 or the terminal devices 120, in various embodiments. For example, in one such embodiment, the processor 114 is configured to implement the method 600. With continued reference to FIG. 1, in yet another embodiment, the method 600 is implemented by the processing device 160 (e.g., the processor 164). In another embodiment, the distribution point 110 and the processing device 160 are each configured to implement at least a part of the method 600. In other embodiments, the method 600 is implemented by other suitable communication devices.

At block 602, the increase counter $l_i^{inc}$ and decrease counter $l_i^{dec}$ are reset to zero for all values of $i \in \mathcal{N}$. In an embodiment, blocks 604, 606, 608, 610, and 612 are performed for each $i \in \mathcal{N}$.

At block 604, the requested data rate $e_i$ is determined.

At block 606, the average allocated data rate $w_i$ is determined.

At block 608, the allocation increase threshold $w_i^{high}$ and the allocation decrease threshold $w_i^{low}$ are determined with $h=q_i$ and $g=q_i-1$.

At block 610, the increase counter $l_i^{inc}$ is incremented if the allocation increase threshold is met and the decrease counter $l_i^{dec}$ is incremented if the allocation decrease threshold is met. If the allocation increase threshold is not met, then the increase counter $l_i^{inc}$ is set to zero. If the allocation decrease threshold is not met, then the decrease counter $l_i^{dec}$ is set to zero.

At block 612, the allocation of time slots is adjusted based on the increase counter and/or decrease counter. In an embodiment, if the increase counter $l_i^{inc}$ is equal to the increase threshold and $q_i<M$, then $q_i'=q_i+1$ and the increase counter $l_i^{inc}$ is reset to zero, where $q_i'$ is the number of allocated time slots for the subsequent time interval. In other words, if the allocated time slots are almost filled with data for several consecutive time intervals, then increase the number of allocated time slots, if possible. In an embodiment, if the decrease counter $l_i^{dec}$ is equal to the decrease threshold and $q_i>1$, then $q_i'=q_i-1$ and the decrease counter $l_i^{dec}$ is reset to zero. In other words, if the allocated time slots are not filled with data for several consecutive time intervals, then decrease the number of allocated time slots, if possible.

Figure 7:
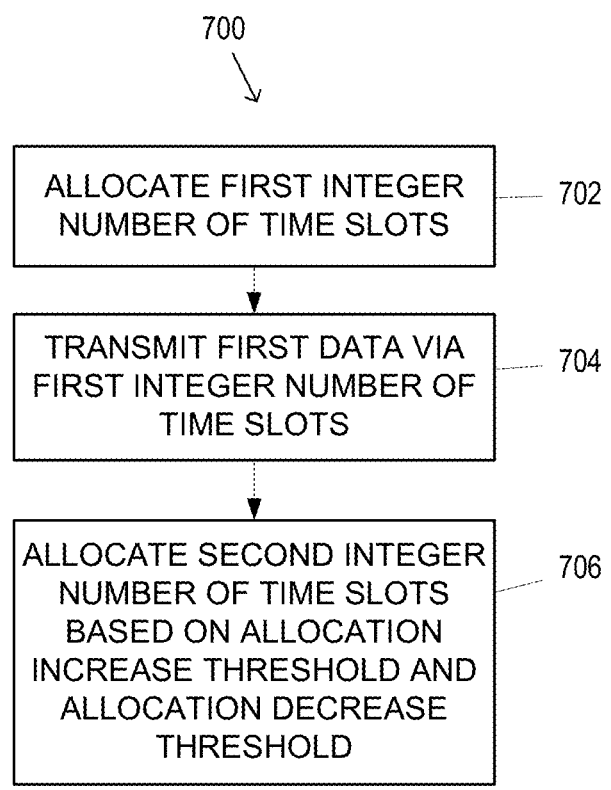
FIG. 7 is a flow diagram of an example method for allocating time slots using the left-to-right allocation process, according to an embodiment.

FIG. 7 is a flow diagram of an example method 700 for allocating time slots using the left-to-right allocation process, according to an embodiment. In an embodiment, the method 700 is implemented in a first communication device for allocating time slots 204 of a shared schedule 200 for a plurality of communication lines 130 having a crosstalk relationship. With reference to FIG. 1, the method 700 is implemented by the distribution point 110 or the terminal devices 120, in various embodiments. For example, in one such embodiment, the processor 114 is configured to implement the method 700. With continued reference to FIG. 1, in yet another embodiment, the method 700 is implemented by the processing device 160 (e.g., the processor 164). In another embodiment, the distribution point 110 and the processing device 160 are each configured to implement at least a part of the method 700. In other embodiments, the method 700 is implemented by other suitable communication devices.

At block 702, a first integer number $q_i$ of allocated time slots 204 of the shared schedule 200 corresponding to a first time interval 206 are allocated for first data to be transmitted by the communication device 120 via one of the plurality of communication lines 130 during the first integer number $q_i$ of allocated time slots 204. The first integer number $q_i$ of allocated time slots 204 are allocated according to respective priorities of the time slots 204 in a decreasing order. For example, the time slots 204 are arranged in time sequentially by priority in the decreasing order. In an embodiment, the shared schedule repeats for the plurality of communication lines over a plurality of time intervals that includes the first time interval and the second time interval. In an embodiment, the allocation increase threshold is different from the allocation decrease threshold.

At block 704, the first data is transmitted via the first integer number $q_i$ of allocated time slots 204.

At block 706, a second integer number $q_i'$ of allocated time slots 204 of the shared schedule 200 corresponding to a second time interval 208 is allocated for second data to be transmitted by the first communication device via the one of the plurality of communication lines 130 during the second integer number $q_i'$ of time slots 204 based on an allocation increase threshold and an allocation decrease threshold. The second integer number $q_i'$ is larger than the first integer number $q_i$ if the allocation increase threshold has been met. The allocation increase threshold is based on utilization of a first time slot $v_{ih}$ of the first integer number of allocated time slots, and the first time slot $v_{ih}$ has a lowest priority of the first integer number of allocated time slots. The second integer number $q_i'$ is smaller than the first integer number $q_i$ if the allocation decrease threshold has been met. The allocation decrease threshold is based on utilization of a second time slot $v_{ig}$ of the first integer number of allocated time slots, and the second time slot $v_{ig}$ has a higher priority than the first time slot.

In an embodiment, the second data is transmitted via a plurality of data units during the second time interval. The plurality of data units includes a first data unit and a second data unit and a transmission of a portion of the first data unit overlaps with a transmission of a portion of the second data unit, as described herein.

Figure 8:
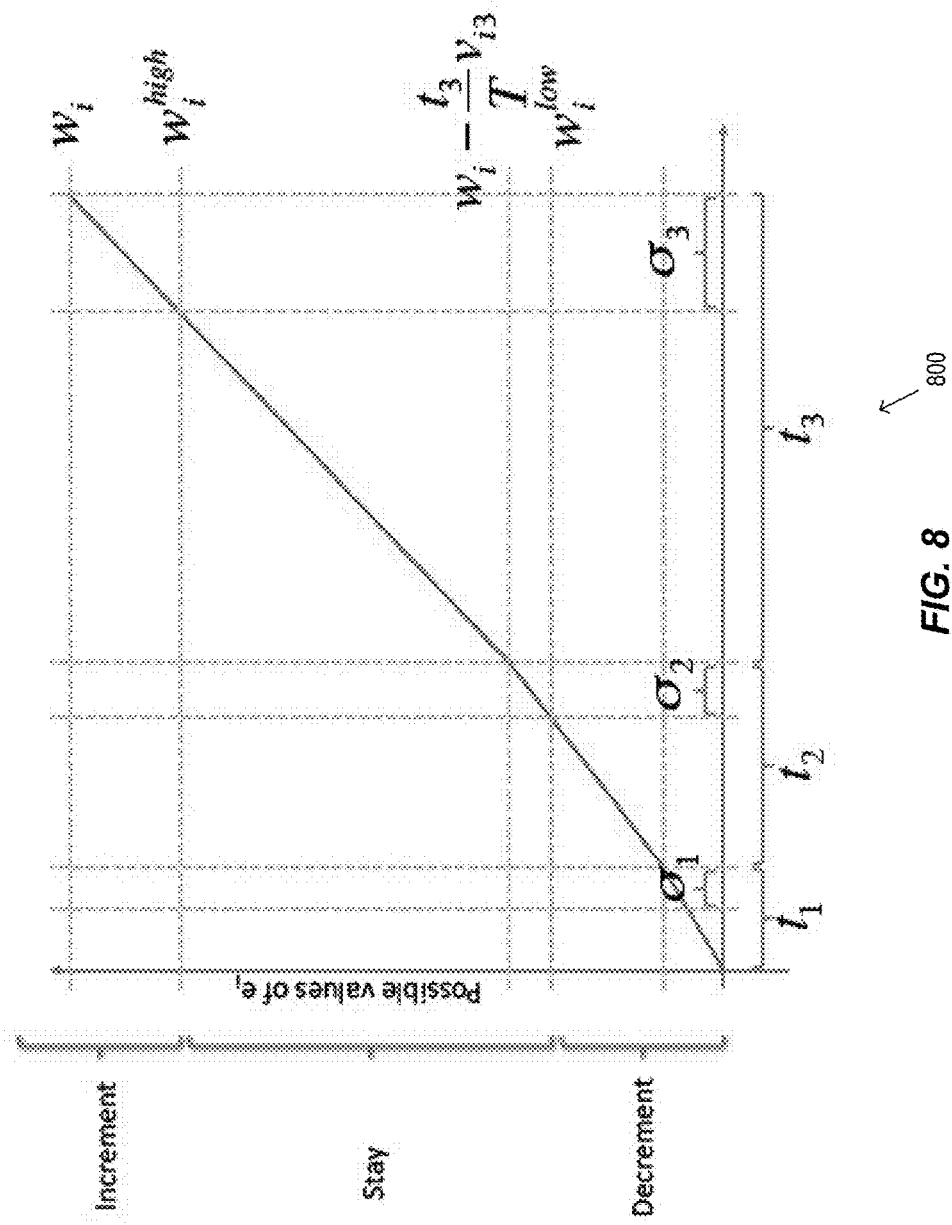
FIG. 8 is a diagram of an example graph that shows a relationship between parameters for allocating time slots, according to an embodiment.

FIG. 8 is a diagram of an example graph 800 that shows a relationship between parameters for allocating time slots, according to an embodiment. The parameters $e_i$, $w_i$, $w_i^{high}$, $w_i^{low}$, $\sigma_j$, and $t_j$ are shown using the same values for $\sigma_j^+$ and $\sigma_j^-$. In some embodiments, the parameters $\sigma_j^+$ and $\sigma_j^-$ are different for two or more communication lines. In one such embodiment, the parameters are defined as $\sigma_{i,j}^+$ and $\sigma_{i,j}^-$ with $i \in \mathcal{N}$, $j \in \mathcal{M}$.

In some embodiments, OFDM symbols transmitted at the beginning of a time slot may use a more robust modulation and coding scheme (e.g., for signaling reasons) or be a preamble-type OFDM symbol. These symbols can generally support a higher level of interference than other OFDM symbols, such as data symbols modulated with higher order constellations. In an embodiment, a transmitter on a communication line 130 is allowed to overlap a transmission into the time slot that follows. In an embodiment, for example, a transceiver 112 transmits a data unit during allocated time slots $q_i$ and during a portion of time slot $q_{i+1}$.

In some embodiments, the distribution point 110 omits the limitation that time slots 204 are arranged in time sequentially by priority in the decreasing order. In an embodiment, the allocation of time slots can be modeled as an optimization problem (P), as shown in equation 902 (FIG. 9), where $w_i(x)$ is computed as shown in equation 904, and the signal to noise ratio is computed as shown in equation 906. In this embodiment, a solution to the problem (P) can potentially have an arbitrary distribution of time slots 204, such as the allocation shown in the matrix 908. For communication lines that have a relatively strong mutual crosstalk relationship, a solution to the optimization problem (P) will tend to allocate non-overlapping time slots where possible. In various embodiments, the distribution point 110 performs a branch and bound algorithm to determine an allocation for the optimization problem (P).

For determining an allocation for the optimization problem (P), a search set $\mathcal{D}$ from a search space for a communication system with N lines and M time slots is the set $\{0,1\}^{N \times M}$, which has cardinality $2^{N \times M}$. In various embodiments, the optimization problem (P) is solved based on an assumption that an upper bound E of the problem (P) is determinable. In other words, $\alpha(x^*) \leq E$, where $x^*$ is the value of x that minimizes $\alpha(x)$ in problem (P). An element of x with indices a, b ($x_{ab}$) with $a \in \mathcal{N}$, $b \in \mathcal{M}$, is utilized to divide the search set $\mathcal{D}$. In an embodiment, the search set $\mathcal{D}$ is divided into two subsets: a first subset $\mathcal{D}'$ where $x_{ab}=1$, and a second subset $\mathcal{D}''$ where $x_{ab}=0$. In various embodiments, the optimization problem (P) is solved based on an assumption that a lower bound $\tau'$ of the first subset $\mathcal{D}'$ and a lower bound $\tau''$ of the second subset $\mathcal{D}''$ can be determined or estimated, as shown in equation 1002 and equation 1004 (FIG. 10). With this assumption, it can be determined that $x^*$ is not within $\mathcal{D}'$ if $\tau' > E$, and thus the entire subset $\mathcal{D}'$ of allocations can be discarded from the search space. Similarly, it can be determined that $x^*$ is not within $\mathcal{D}''$ if $\tau'' > E$, and thus the entire subset $\mathcal{D}''$ of allocations can be discarded from the search space. In general, the distribution point 110 can exclude a subset $\mathcal{D}'$ from the search space utilizing i) a method to create the subset $\mathcal{D}'$, ii) a method to determine an upper bound of the performance metric $\alpha(x^*)$, and a method to compute a lower bound $\tau'$ of the value of $\alpha$ in the subset $\mathcal{D}'$ by verifying that lower bound $\tau' >$ upper bound $E$.

In an embodiment, the method to generate the subsets describes the subset $\mathcal{D}'$ by using a pair $(\Delta, y)$ where $\Delta \in$ $\{0,1\}^{N \times M}$ and $y \in \{0,1\}^{N \times M}$. Each element $\Delta_{ij}$ (i.e., the element at the i-th row and j-th column of $\Delta$) indicates whether $x_{ij}$ is unspecified in subset $\mathcal{D}'$ or whether it has a specific value. If $\Delta_{ij}=0$, then $x_{ij}$ is not specified and can be either 0 or 1. In other words, the ij-th component of x is "relaxed" or unconstrained. If $\Delta_{ij}=0$, then $x_{ij}$ is specified and has a fixed value (either 0 or 1), given by the value of $y_{ij}$. The pair $(\Delta, y)$ thus includes a constraint matrix $\Delta$ and a value matrix y which describe the subset $\mathcal{D}'$, as shown in equation 1006.

FIG. 11 is a diagram of an example table 1100 illustrating examples of constraint matrix $\Delta$, value matrix y, and the corresponding subset $\mathcal{D}'$, according to an embodiment. Table 1100 shows how the size of the subset $\mathcal{D}'$ is determined by the constraint matrix $\Delta$. For example, if a set has a constraint matrix $\Delta$ in which each element is equal to 1 (row 3 of table 1100), then that set has only one possible allocation, given by x=y. If the set has a constraint matrix $\Delta$ in which b elements are equal to 0, then that set has $2^b$ allocations in it. For example, the constraint matrix $\Delta$ in row 4 of table 1100 has three elements with value 0 and has $2^3=8$ allocations. As can be seen from the table 1100, the size of two subsets $\mathcal{D}'$ and $\mathcal{D}''$ can be compared based on the number of zero entries in their corresponding constraint matrices $\Delta'$ and $\Delta''$.

In an embodiment, the method to determine lower bounds on subsets is based on the average allocated data rate $w_i(x)$, shown in equation 1202 (FIG. 12), where the signal to noise ratio is shown in equation 1204. To compute the upper bound on $w_i(x)$, an upper bound on the SNR is selected by using the largest possible value for the numerator and the smallest possible value for the denominator. An upper bound $\hat{x}_{ij}=y_{ij} \oplus (1-\Delta_{ij})$, and a lower bound $\check{x}_{ij}=y_{ij} \otimes_{ij}$, where $\oplus$ is the Boolean OR operator and $\otimes$ is the Boolean AND operator. Using these values, an upper bound of the SNR in subset $\mathcal{D}$ is shown in equation 1206. Using the upper bound of the SNR, an upper bound for the time slot data rate $v_{ij}$ is shown in equation 1208, and an upper bound for the average allocated data rate $w_i(x)$ is shown in equation 1210. Using the upper bound for the average allocated data rate $w_i(x)$, an explicit expression for the lower bound of $\alpha(x)$ when $x \in \mathcal{D}$ can be determined according to a sequence of equations 1302 (FIG. 13) where the lower bound of the performance metric for the subset $\mathcal{D}$ is shown in equation 1304 (FIG. 13).

Figure 14:
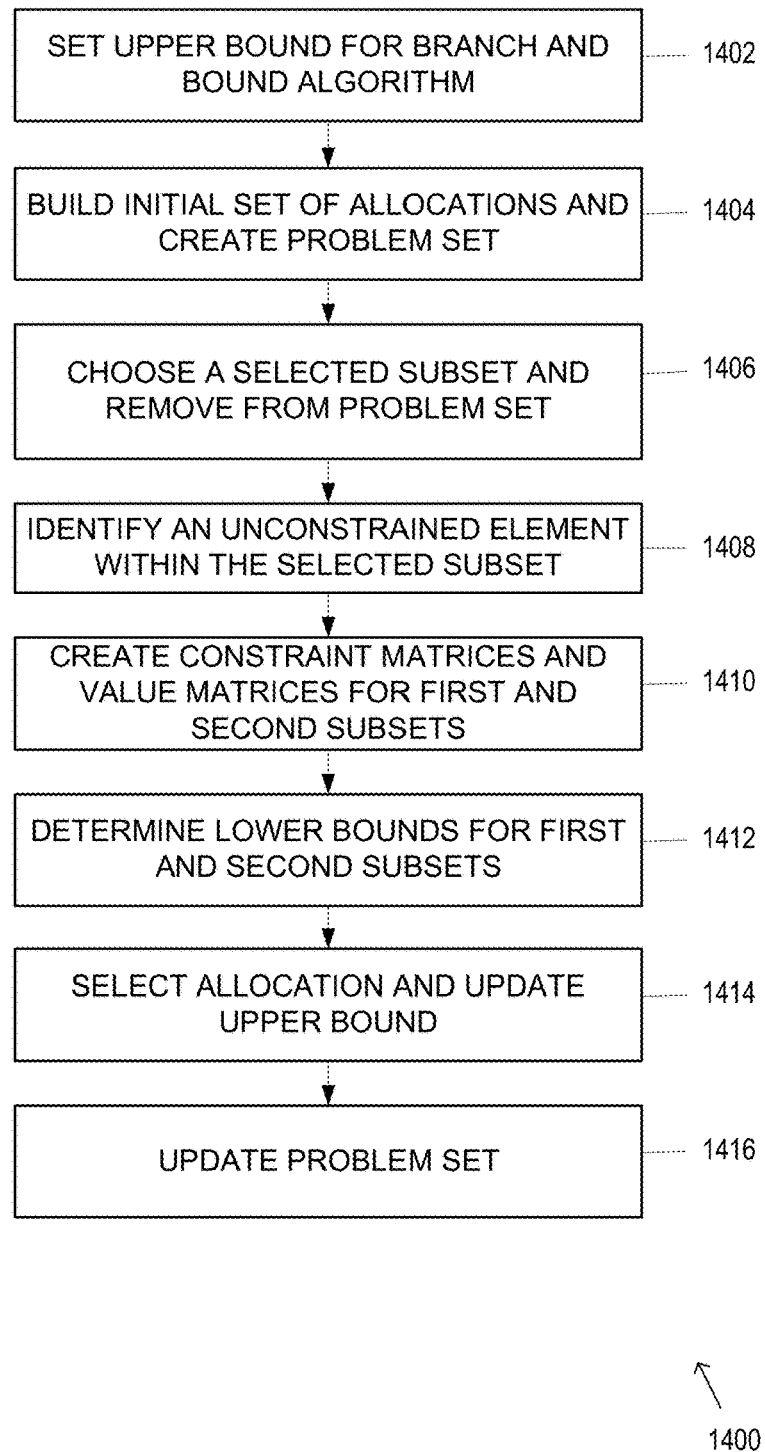
FIG. 14 is a flow diagram of an example method for allocating time slots using a branch and bound algorithm, according to an embodiment.

FIG. 14 is a flow diagram of an example method 1400 for allocating time slots using the branch and bound algorithm, according to an embodiment. With reference to FIG. 1, the method 1400 is implemented by the distribution point 110 or the terminal devices 120, in various embodiments. For example, in one such embodiment, the processor 114 is configured to implement the method 1400. With continued reference to FIG. 1, in yet another embodiment, the method 1400 is implemented by the processing device 160 (e.g., the processor 164). In another embodiment, the distribution point 110 and the processing device 160 are each configured to implement at least a part of the method 1400. In other embodiments, the method 1400 is implemented by other suitable communication devices.

At block 1402, the upper bound E for the branch and bound algorithm is set to an initial value. In an embodiment, the upper bound $E$ is set to a high value, including a value that represents infinity.

At block 1404, an initial set of allocations $\mathcal{D}_0$ is generated, corresponding to a constraint matrix $\Delta_0$ and a value matrix $y_0$ that are both all-zero matrices of dimensions N×M, and a problem set of allocations $\mathbb{P}$ for the problem (P) is set to the initial set of allocations $\mathcal{D}_0$. In an embodiment, blocks 1406, 1408, 1410, 1412, 1414, and 1416 are performed while the problem set of allocations $\mathbb{P}$ is not an empty set.

At block 1406, a selected subset $\mathcal{D}$ is selected and removed from the problem set of allocations $\mathbb{P}$. For example, $\mathbb{P} = \mathbb{P} \sim \{\mathcal{D}\}$. A constraint matrix $\Delta$ and a value matrix y describe the subset $\mathcal{D}$.

At block 1408, an unconstrained element within the constraint matrix $\Delta$ of the selected subset $\mathcal{D}$ is identified. The unconstrained element is an element at indices a, b such that $\Delta_{ab}=0$. The indices a, b are selected using one of various methods. In an embodiment, the indices a, b are selected according to a first element $\Delta_{ab}$ of the constraint matrix $\Delta$ having a value of zero, for example, using a lexicographic order or other suitable order. In another embodiment, the index a is selected for which the requested data rate ea is the highest value and for which some $\Delta_{ab}=$) exists. In other words, the unconstrained element corresponds to a highest requested data rate of a plurality of resource requests for the communication lines 130. In this embodiment, the index b is selected using a lexicographic order or other suitable order. In yet another embodiment, the index a is selected for which $e_i - w_i(\Delta)$ has a highest value and for which some $\Delta_{ab}=0$ exists. In this embodiment, the index b is selected using a lexicographic order or other suitable order.

At block 1410, a first constraint matrix $\Delta'$ and a first value matrix y' for a first subset $\mathcal{D}'$ of the selected subset $\mathcal{D}$ are determined and a second constraint matrix $\Delta''$ and a second value matrix y'' for a second subset $\mathcal{D}''$ of the selected subset $\mathcal{D}$ are determined. For example, the selected subset $\mathcal{D}$ is divided into two subsets: a first subset $\mathcal{D}'$ where $x_{ab}=1$, and a second subset $\mathcal{D}''$ where $x_{ab}=0$. The element $\Delta_{ab}'$, and the element $\Delta_{ab}''$ are set equal to 1, thus the first constraint matrix $\Delta'$ differs from the selected constraint matrix $\Delta$ by an element $\Delta_{ab}'$ of the first constraint matrix $\Delta'$ that corresponds to the identified unconstrained element $\Delta_{ab}$. In an embodiment, the second constraint matrix $\Delta''$ is not used and instead, the first constraint matrix $\Delta'$ is used to describe the first subset $\mathcal{D}'$ and the second subset $\mathcal{D}''$. The element $y_{ab}'$ is set equal to 1 and the element $y_{ab}''$ is set equal to 0, thus the second value matrix y'' differs from the first value matrix y' by the element $y_{ab}''$ of the second value matrix y'' that corresponds to the identified unconstrained element $\Delta_{ab}$.

At block 1412, a first lower bound $\tau'$ is determined for the first subset $\mathcal{D}'$ and a second lower bound $\tau''$ is determined for the second subset $\mathcal{D}''$. In an embodiment, the first lower bound $\tau'$ and second lower bound $\tau''$ are determined according to the equations shown in FIG. 12 and FIG. 13, as described above.

At block 1414, a selected allocation x is selected and the upper bound $\in$ is updated if conditions on the first lower bound $\tau'$ or second lower bound $\tau''$ are met and conditions on the first constraint matrix $\Delta'$ are met. In an embodiment, if the first lower bound $\tau'$ is less than or equal to the upper bound E and the first constraint matrix $\Delta'$ is equal to an all-ones matrix (i.e., $\tau' \leq \in$ and $\Delta'=1^{N \times M}$), then the upper bound E is updated to be equal to the first lower bound $\tau'$ and the selected allocation x̃ is selected as the value matrix y'. In an embodiment, if the second lower bound $\tau''$ is less than or equal to the upper bound $\in$ and the second constraint matrix $\Delta''$ is equal to an all-ones matrix (i.e., $\tau'' \leq \in$ and $\Delta''=1^{N \times M}$), then the upper bound $\in$ is updated to be equal to the second lower bound $\tau''$ and the selected allocation x is selected as the value matrix y''. In other words, the upper bound E is updated to be a lesser of the first lower bound $\tau'$ and the second lower bound $\tau''$ and the selected allocation z is updated to be the value matrix corresponding to the updated lower bound if i) the first constraint matrix $\Delta'$ is an all-ones matrix, and ii) the lesser of the first lower bound $\tau'$ and the second lower bound $\tau''$ is less than the upper bound $\in$.

At block 1416, the problem set of allocations $\mathbb{P}$ is updated based on the first lower bound $\tau'$ and the second lower bound $\tau''$. In an embodiment, if the first lower bound $\tau'$ is less than the upper bound $\in$, then the first subset $\mathcal{D}'$ is returned to the problem set of allocations $\mathbb{P}$. In other words, the first subset $\mathcal{D}'$ is discarded from problem set of allocations $\mathbb{P}$ if the first lower bound $\tau'$ is greater than or equal to the upper bound E. In an embodiment, if the second lower bound $\tau''$ is less than the upper bound $\in$, then the second subset $\mathcal{D}''$ is returned to the problem set of allocations $\mathbb{P}$. In other words, the second subset $\mathcal{D}''$ is discarded from problem set of allocations $\mathbb{P}$ if the second lower bound $\tau''$ is greater than or equal to the upper bound $\in$. If the upper bound has been updated during block 1416, then allocations having lower bounds that are greater than the updated upper bound are discarded from the problem set of allocations $\mathbb{P}$ (i.e., $\mathbb{P} = \{\mathcal{A} \in \mathbb{P} : \check{\alpha}(\mathcal{A}) < \in\}$).

After performing block 1416, an allocation x* to the problem (P) is given by the selected allocation x̃ with value $\in$. In other words, $x^* = \tilde{x}$ and $\alpha(x^*) = \in$. In various embodiments, the method 1400 determines an optimal solution x* within a finite number of iterations. In general, the number of iterations is related to the selection of the selected subset $\mathcal{D}$ from the problem set of allocations $\mathbb{P}$ and the identification of the unconstrained element $\Delta_{ab}$ that is used to divide the selected subset $\mathcal{D}$ into the first subset $\mathcal{D}'$ and second subset $\mathcal{D}''$.

During block 1406, the selected subset $\mathcal{D}$ is selected according to one of various methods. In an embodiment, a first set entered into the problem set of allocations $\mathbb{P}$ is chosen (i.e., choose oldest, or CO method). In another embodiment, a last set entered into the problem set of allocations $\mathbb{P}$ is chosen (i.e., choose newest, or CN method). In yet another embodiment, a set having a lowest lower bound $\check{\alpha}(\mathcal{D})$ within the problem set of allocations $\mathbb{P}$ is chosen (i.e., choose lowest, or CL method). In an embodiment, the smallest set (i.e., a most constrained set having a highest number of non-zero $\Delta_{ij}$ and thus a smallest size) within the problem set of allocations $\mathbb{P}$ is chosen (i.e., choose smallest, or CS method). In yet another embodiment, a combination of the lowest and smallest sets is chosen, in other words, a set having the lowest lower bound from those with the smallest size (i.e., choose lowest of smallest, or CLS method).

In some scenarios, the CLS method provides improved performance as compared to the other methods. In other words, the CLS method results in a determination of the allocation x* within a fewest number of iterations. A numerical example is now described, using an example system with N=3 communication lines, M=4 time slots, and K=1 carrier tone. A configuration 1502 of the example system and requested data rates 1504 are shown in FIG. 15. To obtain an initial upper bound E, the performance metric $\alpha$ is computed for the all-ones matrix (i.e., $\alpha(1^{N \times M})$, corresponding to the G.now configuration described above). By performing the method 1400 for the example system, an optimal solution 1506 is obtained from a problem set of allocations $\mathbb{P} = 2^{N \times M} = 4096$ allocations.

Figures 16, 17:
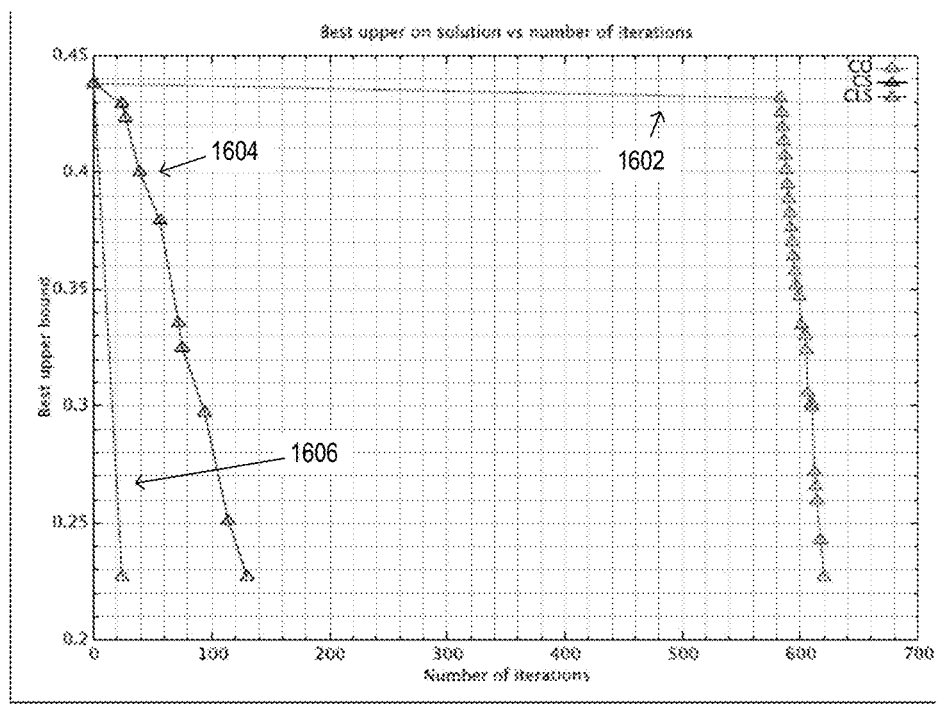

FIG. 16 is a diagram of an example graph 1600 that illustrates a number of iterations used to determine the optimal solution 1506 of the branch and bound algorithm, according to an embodiment. The number of iterations performed to obtain the optimal solution 1506 corresponds to the method used to select the selected subset $\mathcal{D}$. In FIG.

16, the CO method is shown by the line 1602 (requiring 620 iterations), the CS method is shown by the line 1604 (requiring 132 iterations), and the CLS method is shown by the line 1606 (requiring 32 iterations).

In some embodiments and/or scenarios, the determination of the lower bound $\tau'$ and lower bound $\tau''$ is performed more efficiently by re-using elements within the variables. The first subset $\mathcal{D}'$ and second subset $\mathcal{D}''$ differ by only one element: $y_{ab}$ where a, b are the indices of the identified unconstrained element $\Delta_{ab}$ of the constraint matrix. Accordingly, $y_{ij} = y_{ij}' = y_{ij}''$ for all values of $j \in \mathcal{M}$ such that $j \neq b$. Using this equality, previously computed values of the time slot data rates $\hat{c}_{ij}$ can be re-used. In an embodiment, the distribution point 110 stores the computed values of the time slot data rates $\hat{v}_{ij}$ in a data structure (e.g., in the memory 116) and re-uses the values for subsequent calculations. Given that each computation of $\hat{w}_i(\mathcal{D}')$ uses an integer number M values of $\hat{v}_{ij}(\mathcal{D}')$, the re-use of M−1 previously computed values provides savings of approximately (M−1)/M operations. For example, given M=4 time slots, the number of operations to compute $\hat{w}_i(\mathcal{D}')$ is reduced by 75%.

In some embodiments and/or scenarios, the performance metric $\alpha$ is improved by utilizing a normalized performance metric $\alpha_n$. In an embodiment, for example, the normalized performance metric $\alpha_n$ is used in scenarios where there is a large difference between some elements of the requested data rates $\in$. As an illustrative embodiment, an example system has requested data rates e=$[500, 10]^T$ (e.g., communication line 1 requests 500 bytes per second and communication line 2 requests 10 bytes per seconds). In this embodiment, two solutions $x^a$ and $x^b$ exist where $w(x^a)=[491, 2]^T$ and $w(x^b)=[485, 8]^T$. Using the performance metric $\alpha$ as shown in equation 1702 (FIG. 17), then $\alpha(x^a)=9$ and $\alpha(x^b)=15$, which implies that the solution $x^a$ is preferable to solution $x^b$. However, it can be seen that in solution $x^a$, communication line 1 receives 491/500=98.2% of the requested data rate $e_1$ while communication line 2 receives 2/10=20% of the requested data rate e2. In an embodiment, a normalized performance metric an as shown in equation 1704 is used, which results in $\alpha_n(x^a)$=max(500−491/500, 10−2/10)=0.8 and $\alpha_n(x^b)$=max(500−485/500, 10−8/10)=0.2, so that solution $x^b$ is preferable to solution $x^a$.

While the embodiments described herein generally refer to the allocation of the time slots 204, it will be understood that the time slots can be BAT segments, in other suitable embodiments. In an embodiment, the combined duration T is equal to $t_{frame}$. In this embodiment, each DS time slot or US time slot is divided into $M^d$ and $M^u$ BAT segments, respectively. In this embodiment, both the left-to-right allocation process and the branch and bound algorithm can be utilized to determine an allocation of time slots. This embodiment generally provides lower latencies as compared to an embodiment where the combined duration T is equal to $t_{superframe}$ because each communication line 130 has a transmission opportunity within each frame 204; however, the duration $t_{slot}$ for both US and DS is selected so that the BAT segments are suitably large enough to avoid inefficiencies in overhead.

In another embodiment, the combined duration T is equal to $t_{superframe}$. In this embodiment, each DS time slot or US time slot defines a BAT segment. In some scenarios, a communication line 130 may not be allowed to transmit during a given frame. The left-to-right allocation process is less preferable for this embodiment because the latency experienced by each communication line 130 depends upon the requested data rate $e_i$, where lower throughputs are likely to experience higher latencies. However, the latency where $T=_{superframe}$ or $T=t_{frame}$ can be adjusted based on the values chosen for $T_{frame}$ and $T_{superframe}$.

In various embodiments and/or scenarios, the distribution point 110 determines an optimal or near-optimal time slot duration and/or ratio of downstream to upstream traffic. As an example, the system 100 has downstream time slots $t_j^d$ and upstream time slots $t_j^u$. In some scenarios, the combined duration $T^d$ is greater than the combined duration $T^u$, with DS/US ratios of 7:3, 8:2, 9:1, or other suitable ratios. In some scenarios, it may be desirable to dynamically change the DS/US ratio to provide increased upstream capacity, for example, due to a sudden increase in upstream traffic while there is relatively low downstream traffic.

In an embodiment, the distribution point 110 adjusts the DS/US ratio by scaling a length of all the downstream time slots $t_j^d$ by a first factor and scaling a length of all the upstream time slots $t_j^u$ by a second factor such that the overall combined length is maintained (i.e., $T=T^u+T^d$). In this embodiment, the distribution point 110 changes the DS/US ratio for each of the plurality of communication lines 130 simultaneously and also updates start and stop times for each BAT segment.

A default DS/US ratio $\pi_0$ is based on a default DS duration $T_0^d$, a default US duration $T_0^u$, and a default combined duration $T_0$ (i.e., $T_0=T_0^d+T_0^u$), as shown in equation 1802 (FIG. 18). The default DS duration $T_0^d$ and default US duration $T_0^u$ can then be defined as shown in equations 1804 and 1806. By scaling each downstream time slots $t_j^d$ by the first factor and each upstream time slots $t_j^u$ by the second factor, a new combined downstream duration $T^d$ and new combined upstream duration $T^u$ is obtained, which provides a new ratio $\pi$, as shown in equation 1808. A relationship between the new durations and the default durations is shown in equations 1810 and 1812. The scaling factors to achieve the ratio $\pi$ are then shown by equations 1814, where $t_j^d(\pi_0)$ and $t_j^u(\pi_0)$ are the default values for individual BAT segments. The average allocated data rate $w_i^d(\pi)$ and $w_i^u(\pi)$ can then be computed as shown in equations 1816 and 1818, respectively.

The normalized performance metric $\alpha_n^d$ and $\alpha_n^u$ change with the new ratio n, as shown in sequence of equations 1902 (FIG. 19) and sequence of equations 1904. The normalized performance metric $\alpha_n^d(x, \pi)$ and $\alpha_n^u(x, \pi)$ are both affine functions on n, so the actual value of $\pi$ can be ignored when minimizing the normalized performance metrics to determine an allocation using the branch and bound algorithm. In other words, if x* is a solution for problem (P) for a certain $\pi'$, then x* will also be the solution for a different $\pi''$.

In some embodiments, the affinity of $\alpha_n^d(x, \pi)$ and $\alpha_n^u(x, \pi)$ on n allows a definition of a "total metric" that can be utilized to optimize a joint solution (i.e., both upstream and downstream), for example, the total normalized performance metric $\alpha_n^t(\pi)$ as shown in equation 1906. Given that the total normalized performance metric $\alpha_n^t(\pi)$ is the point-wise maximum of two affine functions, it is convex in $\pi$. Accordingly, the optimal value that minimizes the total normalized performance metric $\alpha_n^t(\pi)$ is computed as the value of $\pi$ for which $\alpha_n^d(x, \pi)$ is equal to $\alpha_n^u(x, \pi)$, as shown in the sequence of equations 2002. In other words, for a given set of upstream and downstream time slots, and for a given downstream/upstream ratio $\pi_0$, the values of $\{x_{ij}^d\}$ and $\{x_{ij}^u\}$ that achieve the optimal values for $\alpha_n^d(x, \pi)$ and $\alpha_n^u(x, \pi)$ can be determined, and then the value of $\pi$ can be determined using the sequence of equations 2002.

Figure 21:
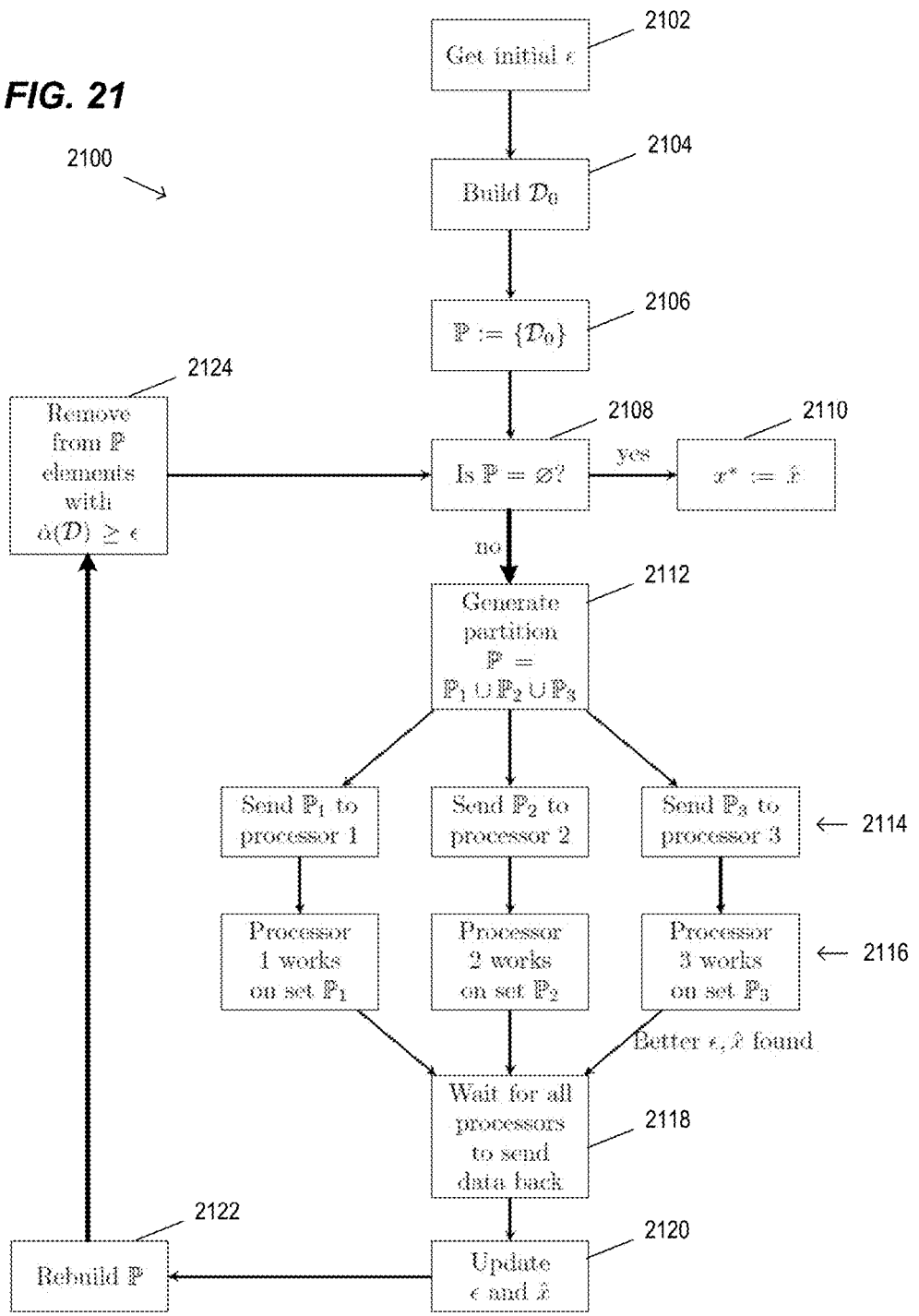
FIG. 21 is a flow diagram of an example method for allocating time slots using the branch and bound algorithm in parallel processes, according to an embodiment.

FIG. 21 is a flow diagram of an example method 2100 for allocating time slots using the branch and bound algorithm in parallel processes, according to an embodiment. With reference to FIG. 1, the method 2100 is implemented by the distribution point 110, in various embodiments. For example, in one such embodiment, multiple instances of the processor 114 are configured to implement the method 2100. With continued reference to FIG. 1, in another embodiment, the method 2100 is implemented by the processing device 160 (e.g., multiple instances of the processor 164). In another embodiment, the distribution point 110 and the processing device 160 are each configured to implement at least a part of the method 2100. In other embodiments, the method 2100 is implemented by other suitable communication devices.

In an embodiment, the problem set of allocations $\mathbb{P}$ is divided into an integer number G of subsets $\mathbb{P}_1, \mathbb{P}_2, \ldots \mathbb{P}_G$ which are then distributed to multiple distributed processors (e.g., G instances of the processor 164). In an embodiment, each distributed processor performs calculations on a respective subset of allocations independently, but communicates an allocation $x^*$ and upper bound $\in$ to a coordinator for the method 2100, as described herein. In an embodiment, an instance of the processor 164 acts as a coordinator for the distributed processors. In another embodiment, the distribution point 110 acts as the coordinator for the distributed processors.

At block 2102, the upper bound E for the branch and bound algorithm is set to an initial value. In an embodiment, the coordinator sets the upper bound $\in$ to a high value, including a value that represents infinity.

At block 2104, an initial set of allocations $\mathcal{D}_0$ is generated, corresponding to a constraint matrix $\Delta_0$ and a value matrix $y_0$ that are both all-zero matrices of dimensions N×M. In an embodiment, block 2102 is performed by the coordinator.

At block 2106, a problem set of allocations $\mathbb{P}$ for the problem (P) is set to the initial set of allocations $\mathcal{D}_0$. In an embodiment, block 2102 is performed by the coordinator.

At block 2108, it is determined whether the problem set of allocations $\mathbb{P}$ is an empty set. If the problem set of allocations $\mathbb{P}$ is an empty set, then the optimal allocation $x^*$ is set to be equal to a selected allocation $\tilde{x}$ at block 2110. If the problem set of allocations $\mathbb{P}$ is not an empty set, then the process proceeds to block 2112. In an embodiment, block 2102 is performed by the coordinator.

At block 2112, the problem set of allocations $\mathbb{P}$ is divided into an integer number G subsets, so that $\mathbb{P} = \mathbb{P}_1 \cup \mathbb{P}_2 \cup \mathbb{P}_3 \cup \ldots \cup \mathbb{P}_G$. In the illustrated embodiment, G is equal to three. In other embodiments, G is equal to 2, 4, 5, 10, or another suitable integer. In an embodiment, block 2102 is performed by the coordinator.

At block 2114, the integer number G of subsets are transmitted to a plurality of distributed processors. In an embodiment, block 2102 is performed by the coordinator, which transmits the subsets to distributed instances of the processors 164. In an embodiment, the plurality of distributed processors includes an integer number G of distributed processors.

At block 2116, each of the plurality of distributed processors performs the branch and bound algorithm. In an embodiment, for example, the processors 164 perform blocks 1406, 1408, 1410, 1412, 1414, and 1416 as described above with respect to FIG. 14 using the subset of the problem set of allocations $\mathbb{P}$. In an embodiment, a distributed processor sends a selected allocation $\tilde{x}$ and corresponding upper bound $\in$ to the coordinator when the selected allocation $\tilde{x}$ has been determined. In another embodiment, the distributed processor performs the branch and bound algorithm until a stop request is received from the coordinator.

At block 2118, selected allocations $\tilde{x}$ and corresponding upper bounds $\in$ are received from the distributed processors. In some embodiments, the coordinator transmits a stop request to the distributed processors to cause the distributed processors to stop processing the subsets and to return any selected allocations $\tilde{x}$ and upper bounds $\in$.

At block 2120, a central selected allocation $\tilde{x}$ and central upper bound $\in$ are determined. In an embodiment, for example, the coordinator selects a central selected allocation $\tilde{x}$ from those selected allocations $\tilde{x}$ received from the distributed processors. In an embodiment, the central selected allocation $\tilde{x}$ corresponds to a lowest value of the upper bounds $\in$ received from the distributed processors.

At block 2122, the problem set of allocations $\mathbb{P}$ is updated based on the central selected allocation $\tilde{x}$ and central upper bound $\in$. In an embodiment, for example, the coordinator returns the subsets $\mathbb{P}_G$ to the problem set of allocations $\mathbb{P}$ (i.e., $\mathbb{P} = \mathbb{P}_1 \cup \mathbb{P}_2 \cup \mathbb{P}_3 \cup \ldots \cup \mathbb{P}_G$), as described above with respect to block 1416.

At block 2124, if the upper bound has been updated during block 2120, then allocations having lower bounds that are greater than the updated upper bound are discarded from the problem set of allocations $\mathbb{P}$ (i.e., $\mathbb{P} = \{\mathcal{A} \in \mathbb{P} : \alpha(\mathcal{A}) < \in\}$). After block 2124, the coordinator returns to block 2108.

Figure 22:
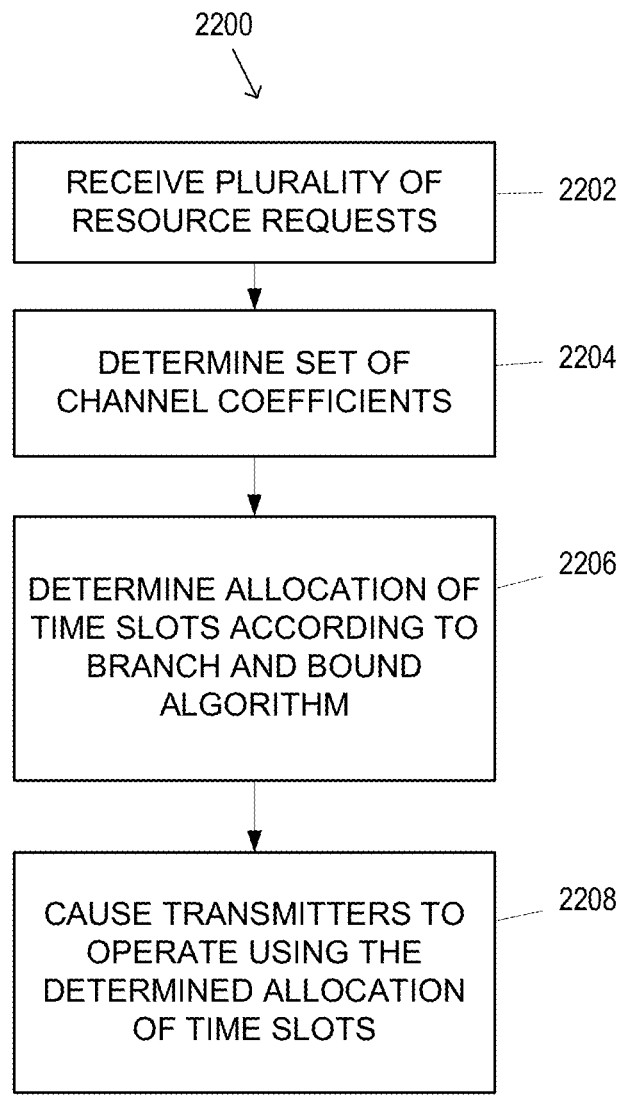
FIG. 22 is a flow diagram of an example method for allocating time slots using the branch and bound algorithm, according to an embodiment.

FIG. 22 is a flow diagram of an example method 2200 for allocating time slots using the branch and bound algorithm, according to an embodiment. The method 2200 is implemented in a first device of a plurality of devices for allocating time slots 204 of a shared schedule 200 for a plurality of communication lines 130 having a crosstalk relationship, in an embodiment. With reference to FIG. 1, the method 2200 is implemented by the distribution point 110 or the terminal devices 120, in various embodiments. For example, in one such embodiment, the processor 114 is configured to implement the method 2200. With continued reference to FIG. 1, in yet another embodiment, the method 2200 is implemented by the processing device 160 (e.g., the processor 164). In another embodiment, the distribution point 110 and the processing device 160 are each configured to implement at least a part of the method 2200. In other embodiments, the method 2200 is implemented by other suitable communication devices.

At block 2202, a plurality of resource requests are received from other devices of the plurality of devices. In an embodiment, each of the plurality of resource requests is indicative of a requested data rate $e_i$ for a different one of the plurality of communication lines 130.

At block 2204, a set of channel coefficients (e.g., $C_{ijk}$) that indicates the crosstalk relationship and a set of noise coefficients (e.g., $\eta_{nk}$) that indicates a background noise for receivers associated with the plurality of communication lines 130 are determined.

At block 2206, an allocation of time slots of the shared schedule is determined within a first time interval (e.g., time interval 206) for the plurality of communication lines 130 based on the plurality of resource requests and the set of channel coefficients according to a branch and bound algorithm. The allocation of time slots indicates whether transmitters associated with the plurality of communication lines (e.g., transceivers 112 and/or transceivers 122) are allowed to transmit during the time slots of the shared schedule within the first time interval.

At block 2208, the transmitters associated with the plurality of communication lines are caused to operate using the determined allocation of time slots. In an embodiment, for example, the distribution point 110 sends the allocation of time slots (or a portion thereof) to the transceivers 112 and 122.

In an embodiment, each of the plurality of communication lines 130 has a respective allocated average data rate $w_i$ for the first time interval that is based on the set of channel coefficients $C_{ijk}$ and a number of transmitters allowed to transmit during each time slot 204 of the shared schedule 200 (e.g., where $x_{ij}$ is equal to 1 for each time slot 204). In an embodiment, block 2206 includes selecting a selected allocation $\tilde{x}$ of time slots 204 from a set of allocations $\mathbb{P}$ based on respective performance metrics $\alpha$ for each of the set of allocations. Each of the respective performance metrics $\alpha$ is based on: i) the requested data rate $e_i$ for each of the plurality of resource requests, and ii) the allocated average data rate $w_i$ for the first time interval for each of the plurality of communication lines.

In an embodiment, selecting the selected allocation $\tilde{x}$ of time slots from the set of allocations includes selecting the selected allocation $\tilde{x}$ that minimizes the performance metric $\alpha$. In this embodiment, a selected subset $\mathcal{D}$, which is selected from the set of allocations $\mathbb{P}$, is divided into a first subset $\mathcal{D}'$ and a second subset $\mathcal{D}''$. A first lower bound $\tau'$ of the performance metric for allocations in the first subset $\mathcal{D}'$ is determined. A second lower bound $\tau''$ of the performance metric for allocations in the second subset $\mathcal{D}''$ is determined. The first subset $\mathcal{D}'$ is discarded from the set of allocations $\mathbb{P}$ if the first lower bound $\tau'$ is greater than or equal to an upper bound E for the branch and bound algorithm. The second subset $\mathcal{D}''$ is discarded from the set of allocations $\mathbb{P}$ if the second lower bound $\tau''$ is greater than or equal to the upper bound $\in$.

In an embodiment, the selected subset $\mathcal{D}$ corresponds to a selected constraint matrix $\Delta$ and a selected value matrix y. An unconstrained element $\Delta_{ab}$ within the selected constraint matrix $\Delta$ is identified. The first subset $\mathcal{D}'$ corresponds to a first constraint matrix $\Delta'$ and a first value matrix y'. The second subset $\mathcal{D}''$ corresponds to the first constraint matrix $\Delta'$ and a second value matrix y''. The first constraint matrix $\Delta'$ differs from the selected constraint matrix $\Delta$ by an element of the first constraint matrix $\Delta'$ that corresponds to the identified unconstrained element $\Delta_{ab}$. The second value matrix y'' differs from the first value matrix y' by an element $y_{ab}''$ of the second value matrix y'' that corresponds to the identified unconstrained element $\Delta_{ab}$.

In an embodiment, the upper bound $\in$ is updated to be a lesser of the first lower bound $\tau'$ and the second lower bound $\tau''$ if i) the first constraint matrix is an all-ones matrix, and ii) the lesser of the first lower bound $\tau'$ and the second lower bound $\tau''$ is less than the upper bound $\in$. The selected allocation $\tilde{x}$ of time slots is updated to be one of the first value matrix or the second value matrix that corresponds to the updated upper bound $\in$. Allocations from the set of allocations $\mathbb{P}$ that have lower bounds that are greater than the updated upper bound $\in$ are discarded from the set of allocations $\mathbb{P}$.

In an embodiment, dividing the selected subset $\mathcal{D}$ includes selecting the selected subset $\mathcal{D}$ having a highest number of non-zero elements in the selected constraint matrix.

In an embodiment, identifying the unconstrained element within the selected constraint matrix includes identifying the unconstrained element corresponding to a highest requested data rate of the plurality of resource requests.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method implemented in a first device of a plurality of devices for allocating time slots of a shared schedule for a plurality of communication lines having a crosstalk relationship, the method comprising:

receiving, at the first device and from other devices of the plurality of devices, a plurality of resource requests, wherein each of the plurality of resource requests is indicative of a requested data rate for a different one of the plurality of communication lines, and wherein each of the plurality of communication lines is associated with a respective pair of devices within the plurality of devices;

determining, by the first device, a set of channel coefficients that indicates the crosstalk relationship and a set of noise coefficients that indicates a background noise for receivers associated with the plurality of communication lines;

determining, by the first device, an allocation of time slots of the shared schedule within a first time interval for the plurality of communication lines based on the plurality of resource requests and the set of channel coefficients according to a branch and bound algorithm, wherein the allocation of time slots indicates whether transmitters associated with the plurality of communication lines are allowed to transmit during the time slots of the shared schedule within the first time interval, wherein the allocation of time slots includes at least one time slot during which multiple transmitters are allowed to transmit; and causing, by the first device, the transmitters associated with the plurality of communication lines to operate using the determined allocation of time slots.

2. The method of claim 1, wherein:

each of the plurality of communication lines has a respective allocated average data rate for the first time interval that is based on the set of channel coefficients and a number of transmitters allowed to transmit during each time slot of the shared schedule; and determining the allocation of time slots comprises selecting a selected allocation of time slots from a set of allocations based on respective performance metrics for each of the set of allocations, wherein each of the respective performance metrics is based on: i) the requested data rate for each of the plurality of resource requests, and ii) the allocated average data rate for the first time interval for each of the plurality of communication lines.

3. The method of claim 2, wherein selecting the selected allocation of time slots from the set of allocations comprises selecting the selected allocation that minimizes the performance metric; and
the method further comprises:
dividing a selected subset of allocations, selected from the set of allocations, into a first subset and a second subset;
determining i) a first lower bound of the performance metric for allocations in the first subset, and ii) a second lower bound of the performance metric for allocations in the second subset;
discarding the first subset from the set of allocations if the first lower bound is greater than or equal to an upper bound for the branch and bound algorithm; and
discarding the second subset from the set of allocations if the second lower bound is greater than or equal to the upper bound.

4. The method of claim 3, wherein:
the selected subset of allocations corresponds to a selected constraint matrix and a selected value matrix;
the method further comprises identifying an unconstrained element within the selected constraint matrix;
the first subset corresponds to a first constraint matrix and a first value matrix;
the second subset corresponds to the first constraint matrix and a second value matrix;
the first constraint matrix differs from the selected constraint matrix by an element of the first constraint matrix that corresponds to the identified unconstrained element; and
the second value matrix differs from the first value matrix by an element of the second value matrix that corresponds to the identified unconstrained element.

5. The method of claim 4, further comprising:
updating the upper bound to be a lesser of the first lower bound and the second lower bound if i) the first constraint matrix is an all-ones matrix, and ii) the lesser of the first lower bound and the second lower bound is less than the upper bound;
updating the selected allocation of time slots to be one of the first value matrix or the second value matrix that corresponds to the updated upper bound; and
discarding allocations from the set of allocations that have lower bounds that are greater than the updated upper bound.

6. The method of claim 4, wherein dividing the selected subset of allocations comprises selecting the selected subset of allocations having a highest number of non-zero elements in the selected constraint matrix.

7. The method of claim 4, wherein identifying the unconstrained element within the selected constraint matrix comprises identifying the unconstrained element corresponding to a highest requested data rate of the plurality of resource requests.

8. A first communication device for allocating time slots of a shared schedule for a plurality of communication lines having a crosstalk relationship, comprising:
a network interface device having one or more integrated circuits configured to:
receive, from other devices of the plurality of devices, a plurality of resource requests, wherein each of the plurality of resource requests is indicative of a requested data rate for a different one of the plurality of communication lines, and wherein each of the plurality of communication lines is associated with a respective pair of devices within the plurality of devices;
determine a set of channel coefficients that indicates the crosstalk relationship and a set of noise coefficients that indicates a background noise for receivers associated with the plurality of communication lines;
determine an allocation of time slots of the shared schedule within a first time interval for the plurality of communication lines based on the plurality of resource requests and the set of channel coefficients according to a branch and bound algorithm, wherein the allocation of time slots indicates whether transmitters associated with the plurality of communication lines are allowed to transmit during the time slots of the shared schedule within the first time interval, wherein the allocation of time slots includes at least one time slot during which multiple transmitters are allowed to transmit; and
cause the transmitters associated with the plurality of communication lines to operate using the determined allocation of time slots.

9. The first communication device of claim 8, wherein:
each of the plurality of communication lines has a respective allocated average data rate for the first time interval that is based on the set of channel coefficients and a number of transmitters allowed to transmit during each time slot of the shared schedule; and
the one or more integrated circuits are configured to select a selected allocation of time slots from a set of allocations based on respective performance metrics for each of the set of allocations, wherein each of the respective performance metrics is based on: i) the requested data rate for each of the plurality of resource requests, and ii) the allocated average data rate for the first time interval for each of the plurality of communication lines.

10. The first communication device of claim 9, wherein the one or more integrated circuits are configured to:
select the selected allocation that minimizes the performance metric;
divide a selected subset of allocations, selected from the set of allocations, into a first subset and a second subset;
determine i) a first lower bound of the performance metric for allocations in the first subset, and ii) a second lower bound of the performance metric for allocations in the second subset;
discard the first subset from the set of allocations if the first lower bound is greater than an upper bound for the branch and bound algorithm; and
discard the second subset from the set of allocations if the second lower bound is greater than the upper bound.

11. The first communication device of claim 10, wherein:
the selected subset of allocations corresponds to a selected constraint matrix and a selected value matrix;
the one or more integrated circuits are configured to identify an unconstrained element within the selected constraint matrix;
the first subset corresponds to a first constraint matrix and a first value matrix;

the second subset corresponds to the first constraint matrix and a second value matrix;

the first constraint matrix differs from the selected constraint matrix by an element of the first constraint matrix that corresponds to the identified unconstrained element; and the second value matrix differs from the first value matrix by an element of the second value matrix that corresponds to the identified unconstrained element.

12. The first communication device of claim 11, wherein the one or more integrated circuits are configured to:

update the upper bound to be a lesser of the first lower bound and the second lower bound if i) the first constraint matrix is an all-ones matrix, and ii) the lesser of the first lower bound and the second lower bound is less than the upper bound;

update the selected allocation of time slots to be one of the first value matrix or the second value matrix that corresponds to the updated upper bound; and discard allocations from the set of allocations that have lower bounds that are greater than the updated upper bound.

* * * * *